US010005961B2

(12) United States Patent
Weaver et al.

(10) Patent No.: US 10,005,961 B2
(45) Date of Patent: Jun. 26, 2018

(54) METHODS, SYSTEMS, AND DEVICES FOR CONTINUOUS LIQUID FUEL PRODUCTION FROM BIOMASS

(71) Applicant: Proton Power, Inc., Lenoir City, TN (US)

(72) Inventors: Samuel C. Weaver, Knoxville, TN (US); Daniel L. Hensley, Knoxville, TN (US); Samuel P. Weaver, Boulder, CO (US); Daniel C. Weaver, Boulder, CO (US)

(73) Assignee: Proton Power, Inc., Lenoir City, TN (US)

( * ) Notice: Subject to any disclaimer, the term of this patent is extended or adjusted under 35 U.S.C. 154(b) by 781 days.

(21) Appl. No.: 13/800,228

(22) Filed: Mar. 13, 2013

(65) Prior Publication Data

US 2014/0059921 A1    Mar. 6, 2014

Related U.S. Application Data

(60) Provisional application No. 61/694,049, filed on Aug. 28, 2012.

(51) Int. Cl.
*C10L 1/00*    (2006.01)
*C10G 1/00*    (2006.01)
(Continued)

(52) U.S. Cl.
CPC ............... *C10G 1/002* (2013.01); *C10G 3/50* (2013.01); *C10L 1/08* (2013.01); *C10G 2300/1014* (2013.01); *Y02P 30/20* (2015.11)

(58) Field of Classification Search
CPC .. C10G 1/002; C10G 2300/1014; C10G 3/50; C10L 1/08; Y02P 30/20
(Continued)

(56) References Cited

U.S. PATENT DOCUMENTS 3,446,609 A    5/1969   Reinmuth
4,166,802 A    9/1979   Slater
(Continued)

FOREIGN PATENT DOCUMENTS

CN        201896159      7/2011
CN       20181896159     7/2011
(Continued)

OTHER PUBLICATIONS

International Search Report for PCT/US2013/055927 dated Nov. 21, 2013, Korean Intellectual Property Office.
(Continued)

*Primary Examiner* — Latosha Hines
(74) *Attorney, Agent, or Firm* — Wilson Patent Law, LLC

(57) ABSTRACT

Methods, systems, and devices for continuous production of liquid fuels from biomass are provided. Some embodiments utilize a thermochemical process to produce a bio-oil in parallel with a thermochemical process to produce a hydrogen-rich synthesis gas. Both product streams may be fed into a third reaction chamber that may enrich the bio-oil with the hydrogen gas, for example, in a continuous production process. One product stream may include a liquid fuel such as diesel. Some embodiments may also produce other product streams including, but not limited to, electrical power generation and/or biochar.

9 Claims, 13 Drawing Sheets

(51) Int. Cl.
*C10L 1/08* (2006.01)
*C10G 3/00* (2006.01)

(58) Field of Classification Search
USPC .......................... 44/307; 422/600, 606, 624
See application file for complete search history.

(56) References Cited

U.S. PATENT DOCUMENTS

| | | | |
|---|---|---|---|
| 4,211,540 A | 7/1980 | Netzer | |
| 4,218,303 A | 8/1980 | Finn | |
| 4,324,643 A | 4/1982 | Durai-Swamy | |
| 4,424,065 A | 1/1984 | Langhoff | |
| 4,435,374 A | 3/1984 | Helm | |
| 4,448,588 A | 5/1984 | Cheng | |
| 4,497,637 A * | 2/1985 | Purdy | C10J 3/466 252/373 |
| 4,592,762 A | 6/1986 | Babu | |
| 4,824,580 A | 4/1989 | Standridge | |
| 5,019,135 A | 5/1991 | Sealock | |
| 5,120,892 A | 6/1992 | Skraba | |
| 5,370,715 A | 12/1994 | Kortzeborn | |
| 5,417,817 A | 5/1995 | Dammann | |
| 5,651,953 A | 7/1997 | Yokoyama | |
| 6,027,635 A | 2/2000 | Busson | |
| 6,133,328 A | 10/2000 | Lightner | |
| 6,141,796 A | 11/2000 | Cummings | |
| 6,149,859 A | 11/2000 | Jahnke | |
| 6,250,236 B1 | 6/2001 | Feizollahi | |
| 6,455,011 B1 | 9/2002 | Fujimura | |
| 6,830,597 B1 | 12/2004 | Green | |
| 7,105,244 B2 | 9/2006 | Kamo | |
| 7,132,183 B2 | 11/2006 | Galloway | |
| 7,144,826 B2 | 12/2006 | Roters | |
| 7,192,666 B2 | 3/2007 | Calhoon | |
| 7,208,530 B2 | 4/2007 | Norbeck | |
| 7,220,502 B2 | 5/2007 | Galloway | |
| 7,473,285 B2 | 1/2009 | Russell | |
| 7,658,776 B1 | 2/2010 | Pearson | |
| 8,236,173 B2 | 8/2012 | Bartek | |
| 8,303,676 B1 | 11/2012 | Weaver | |
| 8,465,562 B2 | 6/2013 | Schubert | |
| 8,541,637 B2 | 9/2013 | Babicki | |
| 8,691,115 B2 | 4/2014 | Schubert | |
| 8,696,775 B2 | 4/2014 | Weaver | |
| 8,845,772 B2 | 9/2014 | Schubert | |
| 8,999,022 B2 | 4/2015 | Chen | |
| 9,023,124 B2 | 5/2015 | Weaver | |
| 9,023,243 B2 | 5/2015 | Weaver | |
| 9,221,681 B2 | 12/2015 | Alyaser | |
| 9,254,461 B2 | 2/2016 | Weaver | |
| 9,382,482 B2 | 7/2016 | Weaver | |
| 9,416,326 B2 | 8/2016 | Paganessi | |
| 9,561,956 B2 | 2/2017 | Weaver | |
| 2002/0048545 A1 | 4/2002 | Lewis | |
| 2003/0022035 A1 | 1/2003 | Galloway | |
| 2004/0058207 A1 | 3/2004 | Galloway | |
| 2004/0115492 A1 | 6/2004 | Galloway | |
| 2006/0112638 A1 | 6/2006 | Suyama | |
| 2006/0112639 A1 | 6/2006 | Nick | |
| 2007/0017864 A1 | 1/2007 | Price | |
| 2007/0099038 A1 | 5/2007 | Galloway | |
| 2007/0099039 A1 | 5/2007 | Galloway | |
| 2007/0256360 A1 | 8/2007 | Kindig | |
| 2008/0016770 A1 * | 1/2008 | Norbeck | C10B 53/02 48/209 |
| 2008/0103220 A1 | 5/2008 | Cherry | |
| 2008/0193351 A9 * | 8/2008 | Boardman et al. | 423/210 |
| 2008/0210089 A1 | 9/2008 | Tsangaris | |
| 2008/0300326 A1 | 12/2008 | Schneider | |
| 2009/0007484 A1 | 1/2009 | Smith | |
| 2009/0013601 A1 | 1/2009 | Mandich | |
| 2009/0082604 A1 | 3/2009 | Agrawal | |
| 2009/0158663 A1 | 6/2009 | Deluga | |
| 2009/0318572 A1 | 12/2009 | Sakai | |
| 2010/0018120 A1 | 1/2010 | Kangasoja | |
| 2010/0096594 A1 | 4/2010 | Dahlin | |
| 2010/0129691 A1 | 5/2010 | Dooher | |
| 2010/0186291 A1 | 7/2010 | Yie | |
| 2011/0117006 A1 | 5/2011 | Ljunggren | |
| 2011/0179712 A1 | 7/2011 | Thacker | |
| 2011/0232161 A1 * | 9/2011 | Siskin | C10L 1/04 44/307 |
| 2011/0258914 A1 * | 10/2011 | Banasiak | C10B 49/10 44/307 |
| 2011/0287498 A1 | 11/2011 | Medoff | |
| 2011/0308157 A1 | 12/2011 | Zhang | |
| 2011/0314736 A1 * | 12/2011 | Crespin | C10J 3/56 48/202 |
| 2011/0314881 A1 | 12/2011 | Hatcher | |
| 2012/0047794 A1 * | 3/2012 | Bartek et al. | 44/307 |
| 2012/0058921 A1 | 3/2012 | Van Den Berg | |
| 2012/0101318 A1 | 4/2012 | Ramirez Corredores | |
| 2012/0202897 A1 | 8/2012 | Keskinen | |
| 2012/0266530 A1 | 10/2012 | Ellis | |
| 2013/0008081 A1 | 1/2013 | Weaver | |
| 2013/0011756 A1 | 1/2013 | Weaver | |
| 2013/0079565 A1 | 3/2013 | Miller | |
| 2013/0180489 A1 | 7/2013 | Reeh | |
| 2013/0263498 A1 | 10/2013 | Virent | |
| 2013/0327626 A1 | 12/2013 | Daugaard | |
| 2015/0090939 A1 | 4/2015 | Mahjoob | |
| 2015/0110683 A1 | 4/2015 | McAlister | |
| 2015/0203760 A1 | 7/2015 | Weaver | |
| 2015/0251125 A1 | 9/2015 | Weaver | |
| 2015/0252268 A1 | 9/2015 | Weaver | |
| 2015/0252275 A1 | 9/2015 | Weaver | |
| 2015/0275109 A1 | 10/2015 | Weaver | |
| 2015/0306563 A1 | 10/2015 | Weaver | |
| 2015/0307784 A1 | 10/2015 | Weaver | |

FOREIGN PATENT DOCUMENTS

| | | |
|---|---|---|
| DE | 3627307 | 2/1988 |
| GB | 2310865 | 9/1997 |
| JP | 54117504 | 9/1979 |
| WO | WO 01/66496 | 9/2001 |
| WO | 2007122880 | 11/2007 |
| WO | WO2008028169 | 3/2008 |
| WO | WO 2009081082 A2 * | 7/2009 |
| WO | WO2011052265 | 5/2011 |
| WO | 2011097584 | 8/2011 |
| WO | WO2012009168 | 1/2012 |

OTHER PUBLICATIONS

Ciferno, Jared P. et al., "Benchmarking Biomass Gasification Technologies for Fuesl, Chemicals and Hydrogen Production," prepared for U.S. Department of Energy National Energy Technology Laboratory, Jun. 2002, 65 pages.
Bain, R.L. et al., "Highlights of Biopower Technical Assessment: State of the Industry and Technology," NREL—National Renewable Energy Laboratory, Golden, CO, Apr. 2003, pp. 1-47.
Biomass Energy Data Book, 2011, http://cta.ornl.gov/bedb.
De Klerk, "Fischer-Tropsch Process," Kirk-Othmer Encyclopedia of Chemical Technology, Jan. 2013, 36 pages.
Franco, "The study of reactions influencing the biomass steam gasification process," Fuel 82, 2003, pp. 835-842.
Mao, "Experimental study of hydrogen production by cellulose gasification in supercritical water," Journal of Engineering Thermophysics, vol. 24, No. 3, May 2003, pp. 387-390.

* cited by examiner

METHODS, SYSTEMS, AND DEVICES FOR CONTINUOUS LIQUID FUEL PRODUCTION FROM BIOMASS

CROSS-REFERENCES TO RELATED APPLICATIONS

This application is a non-provisional patent application claiming priority benefit of U.S. provisional patent application Ser. No. 61/694,049, filed on Aug. 28, 2012 and entitled "METHODS, SYSTEMS AND DEVICES FOR CONTINUOUS LIQUID FUEL PRODUCTION FROM BIOMASS," the entire disclosure of which is herein incorporated by reference for all purposes.

BACKGROUND

There have been several methods of hydrogen extraction from cellulose ($C_6H_{10}O_5$). One of the methods is focused on using microbial bugs along with sodium hydroxide (NaOH) and a catalyst to cause a reaction that releases the hydrogen in cellulose and captures the carbon in cellulose as sodium carbonate ($Na_2CO_3$). There is still a remaining need for developing a simpler and cost effective way of generating hydrogen gas from all C—O—H compounds found in cellulosic biomass more generally, and in a fashion that allows efficient use of the resulting hydrogen for use on-site, for purification, packaging, and distribution or for power generation from the reaction-product hydrogen gas using a reciprocating engine, turbine, or fuel cell.

While various cellulosic biomass hydrogen extraction techniques exist in the art, there is still a general need for the development of alternative techniques that may be cost effective, energy efficient and useful for applications using hydrogen, including hydrogen on demand, and conversion to a hydrogen-rich gas stream that can be directly combusted to produce power and heat. Heat and power applications from efficiently generated hydrogen rather than fossil fuels are useful for reducing the greenhouse gas emissions of other applications that require heat or power, including the production of liquid biofuels. This need may be driven at least in part by the wide variety of applications that make use of hydrogen, some of which have significantly different operation considerations than others. Hydrogen, produced on demand, available for use on the site at which it is generated and therefore that does not require extensive infrastructure for its transportation, and produced at atmospheric pressure and lower temperatures than exist in the prior art, would satisfy that need.

Furthermore, extensive work has been done on conversion of cellulose, which is one example of a C—O—H compound, into ethanol (molecular formula: $C_2H_5OH$). Ethanol is known as drinking alcohol found in beverages. Ethanol is a flammable solvent and miscible with water and many organic solvents. The largest use of ethanol is as a motor fuel and fuel additive. In the United States, ethanol is most commonly blended with gasoline as a 10% ethanol blend. This blend is widely sold throughout the U.S. Midwest, and in cities required by the 1990 Clean Air Act to oxygenate their gasoline during wintertime. The energy returned on energy invested for ethanol made from corn in the U.S. is 1.34. This means that it yields 34% more energy than it takes to produce it. While various techniques thus exist in the art for making liquid fuel from C—O—H compounds, there is still a general need for the development of alternative techniques to generate liquid fuel.

In addition, cellulose may be converted to ethanol and some for producing bio-oil. Some techniques may utilize enzymes to convert the cellulose to ethanol. Some techniques may involve the use of synthesis gas from cellulose that is then converted to ethanol using the Fisher-Tropsch method. These techniques have been largely uneconomical. Fast pyrolysis may be used to make bio-oil in some cases. However, the bio-oil is generally not adequate for utilization as produced. While various techniques thus exist in the art for making bio-oil, compounds, there is still a general need for the development of alternative techniques to generate bio-oil and in particular for techniques for generating liquid fuels, such as diesel, from bio-oil using biomass.

BRIEF SUMMARY

Methods, systems, and devices for continuous production of liquid fuels from biomass are provided. Some embodiments utilize a thermochemical process to produce a bio-oil in parallel with a thermochemical process to produce a hydrogen-rich synthesis gas. Both product streams may be fed into a third reaction chamber that may enrich the bio-oil with the hydrogen gas, for example, in a continuous production process. One product stream may include a liquid fuel such as diesel. Some embodiments may also produce other product streams including, but not limited to, electrical power generation and/or biochar.

Some embodiments include a method of continuous liquid fuel production utilizing biomass. The method may include: receiving one or more biomass feedstocks; utilizing a first portion of the one or more biomass feedstocks to produce synthesis gas from a first thermochemical process; utilizing a second portion of the one or more biomass feedstocks to produce bio-oil from a second thermochemical process; and/or generating a liquid fuel through combining the produced synthesis gas and the produced bio-oil.

The first thermochemical process may include: combining water with the first portion of the one or more biomass feedstocks to from a wet biomass feedstock; transferring the wet biomass feedstock to a reaction chamber; and heating the wet biomass feedstock within the reaction chamber such that the elements comprised by the wet biomass feedstock dissociate and react to form at least the synthesis gas. The elements comprises by the wet biomass feedstock may dissociate and react through a non-oxidation reaction to form at least the synthesis gas. The non-oxidation may include a hydrous pyrolysis reaction.

In some embodiments, the synthesis gas includes hydrogen gas. The one or more biomass feedstocks may include at least cellulose, lignin, or hemicellulose. The second thermochemical process may include a fast pyrolysis process.

Generating the liquid fuel through combining the produced synthesis gas and the produced bio-oil may include a hydrotreating process. Generating the liquid fuel through combining the produced synthesis gas and the produced bio-oil may include a hydrocracking process.

The first thermochemical process and the second thermochemical process may be performed concurrently and/or at a common location.

Some embodiments include a system for continuous liquid fuel production from biomass. The system may include: a first reaction chamber configured to produce synthesis gas from a first biomass stream; a second reaction chamber configured to produce bio-oil from a second biomass stream; and/or an enrichment chamber that may be configured to: receive the produced synthesis gas from the first reaction chamber; receive the produced bio-oil from the second reaction chamber; and/or enrich the produced bio-oil with the produced synthesis gas to produce a liquid fuel.

In some embodiments, the enrichment chamber configured to produce the liquid fuel is configured to produce diesel. The enrichment chamber may include a hydrotreating subsystem.

The enrichment chamber may further include a hydrocracking subsystem coupled with the hydrotreating subsystem.

Some embodiments include a source of water configured to mix with the first biomass stream. Some embodiments include: a mixing chamber configured to mix water from the source of water with the first biomass stream to create a wet biomass stream; and/or a conveyor subsystem configured to deliver the wet biomass stream to the first reaction chamber.

Some embodiments include: one or more biomass receivers configured to receive biomass for at least the first biomass stream or the second biomass stream; and/or one or more conveyor subsystems configured to deliver one or more portions of the biomass to the first reaction chamber and the second reaction chamber as a part of the first biomass stream and the second biomass stream respectively.

The first reaction chamber may be configured to produce the synthesis gas from a wet form the first biomass stream. The first reaction chamber may be configured to produce the synthesis gas from the first biomass stream through a non-oxidation reaction. The non-oxidation reaction may include a hydrous pyrolysis reaction.

The first reaction chamber may be configured to operate under atmospheric pressure conditions. The second reaction chamber may be configured to perform fast pyrolysis. The synthesis gas may includes hydrogen gas.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
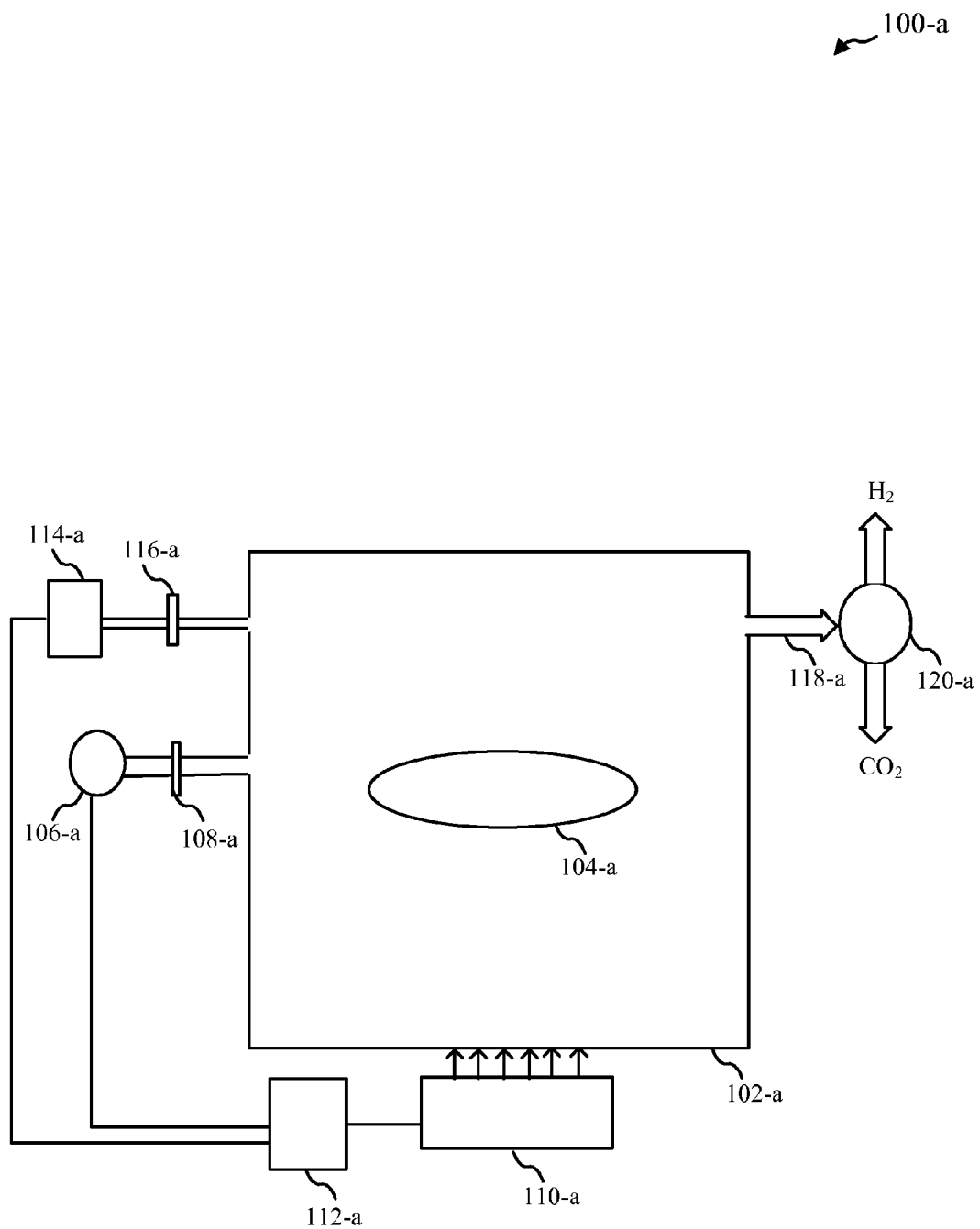
FIG. 1A is a schematic diagram of a simplified system for conversion of C—O—H compounds into hydrogen and/or liquid gas in accordance with various embodiments.

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments, it being understood that various changes may be made in the function and arrangement of elements without departing from the spirit and scope of the invention as set forth in the appended claims. Several embodiments are described herein, and while various features are ascribed to different embodiments, it should be appreciated that the features described with respect to one embodiment may be incorporated within other embodiments as well. By the same token, however, no single feature or features of any described embodiment should be considered essential to every embodiment of the invention, as other embodiments of the invention may omit such features.

Specific details are given in the following description to provide a thorough understanding of the embodiments. However, it will be understood by one of ordinary skill in the art that the embodiments may be practiced without these specific details. For example, systems, networks, processes, and other elements in embodiments may be shown as components in block diagram form in order not to obscure the embodiments in unnecessary detail. In other instances, well-known processes, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process may be terminated when its operations are completed, but could also comprise additional operations not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

Furthermore, embodiments may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Merely for purposes of illustration, certain specific reactions involving the components of cellulosic biomass, also referred to as lignocellulose, including cellulose, hemicellulose and lignin and combinations thereof are described herein as an example of how the methods and processes disclosed may be implemented. The techniques have been found by the inventors, however, to be readily applicable more generally to C—O—H compounds and illustrations using any of these components or combinations thereof are not intended in any way to limit the scope of the invention.

Different embodiments may include different combinations of biomass components. For example, combinations of cellulose, lignin, and/or hemicellulose may be used. Many biomass feedstocks may have one or more of a mixture of cellulose, lignin, hemicellulose and/or trace minerals in their component materials. The chemistries described above may thus govern the processing of the feedstock into a process gas stream of hydrogen and $CO_2$ and trace gases. Some embodiments may utilize feedstocks that include C—O—H, such as paper waste, sawdust of a wide variety of wood types, cardboard, hay, straw, switchgrass, municipal solid waste, sanitized waste, simulated nuclear waste, demolition and construction wood waste; these various feedstocks may generally be referred to as waste products.

Some embodiments may utilize hydrous pyrolysis whose input may be a blend of lignocellulosic feedstocks and water. This may have similarities to many of the existing syn-gas production technologies with the advantages that the reaction may be combined into a single step, a high-hydrogen gas mixture may be produced, the process may be very tolerant to moisture in the input feedstock, and the resulting gas stream can be directly combusted in internal combustion engines.

For example, the biochemical composition of lignocellulosic feedstocks may have three main components: cellulose, lignin, and hemicellulose. Different feedstocks (which may include, but are not limited to, hardwoods, softwoods, grasses, fruits) may have different relative amounts of these three main classes of components. The following provides methods that may be used to calculate the ratio of water needed by each component of feedstock to minimize the solid carbon waste and generation of carbon monoxide in accordance with various embodiments. Using the prescribed amount of water in the reaction may generate a gas product mixture that can be directly combusted in reciprocating engines, and may maximize the generation of hydrogen molecules for bio-hydrogen production.

The general reaction class driven by a hydrous pyrolysis process for some embodiments may be described as:

$$C_xH_yO_z+(2x-z)H_2O=xCO_2+(2x+y/2-z)H_2.$$

So for each mole of lignocellulosic component to be completely converted to $CO_2$ and $H_2$, the number of moles of water required may be described as $2x-z$.

The dominant structures in the biochemical composition of lignocellulosic materials and the water for complete reaction may be as follows and are provided merely as examples:

| Biochemical Component | Chemical Formula | Molecular Mass (g/mol) | Weight Percent of Feedstock | Moles of water required per mole of component | Comments |
|---|---|---|---|---|---|
| Cellulose | $C_6H_{10}O_5$ | 162 | 33-50% | 7 (77.78 wt %) | More in hardwoods |
| Lignin | $C_{9+n}H_{10+3n}O_{2+n}$ | 150 + 31n | 15-25% | $16+n \left( wt\% = \frac{[18(16+n)]}{[150+31n]} \right)$ | $0.9 < n < 1.4$ depending on feedstock |
| Xylan | $C_{17}H_{36}O_8$ | 368 | 5-11% | 26 (127 wt %) | More in hardwoods |
| Glucomannan | $C_{35}H_{49}O_{29}$ | 933 | 1-20% | 41 (79 wt %) | Mostly in softwoods |

For a biomass feedstock with component weight percentages of C % cellulose, L % lignin, G % glucomannan, and X % xylan, the mass water $M_w$, to be added per mass of dry input feedstock mass may be:

$$M_w=\{0.7778C+[18(16+n)/(150+31n)]L+0.79G+1.37X]\}M_F.$$

Merely by way of example, for a hardwood with 45% cellulose, 30% lignin with n=1.2, 2% glucomannan, and 23% xylan, the weight percentage of water to bone-dry cellulosic mass may be 117.59% for complete reaction.

For an input feedstock that is not bone dry (the normal situation) with W % weight percent water, the dry mass of cellulosic feedstock $M_F$ found in the total delivered feedstock $M_T$ may be described as:

$$M_F=(1-W)M_T.$$

So for a delivered mass $M_T$ of feedstock at W weight percent water, the remaining mass of water to be added $M_A$ may be:

$$M_A = M_W - WM_T.$$
$$= M_T(1-W)(0.7778C + [18(16+n)/(150+31n)]L + 0.79G + 1.37X]) - WM_T$$
$$= M_T\{(1-W)(0.7778C + [18(16+n)/(150+31n)]L + 0.79G + 1.37X]) - W\}.$$

In some embodiments, a feed stock may be characterized by an ultimate elemental analysis, rather than the biochemical composition used in the section above. In this case, the weight percentage of the chemical elements found in the feedstock may be provided by the analysis. If the information may be provided in this manner, the following provides an example for pine sawdust of the input to the analysis:

| Chemical Element | Weight percentage (dry) |
|---|---|
| C | 51.3 |
| H | 6.13 |
| O | 42 |
| N | .12 |
| S | .02 |
| Cl | .07 |
| F | — |
| Br | — |
| Total | 99.64 |

Because the participant in the reactions of interest are mainly C, H, and O, and because these elements are over 99% of the dry mass of the feedstock, one may consider only those elements when determining the mass of water to be added to the input feedstock. For an input feed stock with dry mass weight percentage % C of carbon, % H of hydrogen, and % O of oxygen, and using a proto-molecule of $C_xH_yO_z$, the reaction of interest may be described as:

$$C_xH_yO_z+(2x-z)H_2O=xCO_2+(2x+y/2-z)H_2$$

So for each mole of lignocellulosic component to be completely converted to $CO_2$ and $H_2$ the number of moles of water required is $2x-z$.

To find the values of x, y, and z using the ultimate elemental analysis, the following can be calculated for a molar mass of 1 g/mole of input feedstock:

$$x=\%\ C/mass(C)$$
$$y=\%\ H/mass(H)$$
$$z=\%\ O/mass(O).$$

The number of moles of water required to react all of the carbon atoms to carbon dioxide is $2x-z$, which may be represented as:

$$moles(H_2O)=2\%\ C/mass(C)-\%\ O/mass(O).$$

The mass percentage of water $M_w$ to be added relative to the dry input feedstock mass may be thus:

$$M_w=[mass(H_2O)\times(2\%\ C/mass(C)-\%\ O/mass(O))]$$
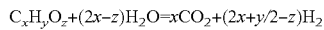

For the example feedstock of pine sawdust, the equation evaluates as:

$$moles(H_2O)=0.085-0.02625=0.05875$$
$$mass(H_2O)=18.$$
$$M_w=1.0575M_F.$$

For an input feedstock that is not bone dry (the normal situation) with W % weight percent water, the dry mass of cellulosic feedstock $M_F$ found in the total delivered feedstock $M_T$ may be described as:

$$M_F=(1-W)M_T.$$

So for a delivered mass $M_T$ of feedstock at W weight percent water, the remaining mass of water to be added $M_A$ may be:

$$M_A = M_W - WM_T$$
$$= M_T(1-W)[mass(H_2O)\times(2\%\ C/mass(C)-\%\ O/mass(O))] - WM_T$$
$$= M_T\{(1-W)[mass(H_2O)\times(2\%\ C/mass(C)-\%\ O/mass(O))] - W\}.$$

Merely by way of example, for 1 tonne of pine sawdust at 25% moisture content, the mass of water to be added may be:

$$M_A = 1\{0.75(1.0575) - .25\}$$
$$= 0.543\ tonne.$$

So for the input tonne of delivered feedstock, there may be 750 kg of dry feedstock and 250 kg of water. By adding 543 liters of water (543 kg), for example, the total mass of water may be 793 kg, or 105.73% of the input dry mass of feedstock, insuring that all carbons may be reacted into carbon dioxide in the pyrolysis process.

Reaction 1 of Conversion of Cellulose into Hydrogen

Cellulose has a molecular formula of $C_6H_{10}O_5$. One possible reaction is that cellulose is disassociated in an inert gas atmosphere or with minimal other gases present upon heating to release $H_2O$ and to generate carbon residue. The reaction may be described by:

$$C_6H_{10}O_5 \rightarrow 6C+5H_2O.$$

However, when started the inventors studied carbonizing cotton for production of carbon fiber, about 15 kg of cotton was introduced to a heating chamber. When the heating cycle ended, about 3 kg of the carbonized cotton was left. It was puzzling that the average yield of the carbon content was 20%-25% at the time of the experiment.

A further understanding of this observation in this experiment leads to the present invention. If the carbon consumes all the oxygen in the cellulose to form carbon dioxide ($CO_2$), the reaction may be described by:

$$2C_6H_{10}O_5 \rightarrow 5CO_2+7C+10H_2.$$

Hence, the remaining carbon may be calculated by using molecular weight as follows:

$$(7\ moles\times M_r\ of\ carbon)/(2\ moles\times M_r\ of\ cellulose)=(7\times12)/(2\times162)=26\%.$$

In addition, if the carbon consumes all the oxygen in the cellulose to form carbon monoxide (CO), the reaction may be defined by:

$$C_6H_{10}O_5 \rightarrow 5CO+C+5H_2.$$

The remaining carbon may be estimated as below:

$M_r$ of carbon/$M_r$ of cellulose=12/162=7%.

Therefore, it is likely that the dominant reaction during cellulose heating (pyrolysis) may result in a mixture of CO and $CO_2$, with $CO_2$ dominant in the mixture. Hence, cellulose heated in an inert gas may result in the following chemical reaction:

$$2C_6H_{10}O_5 \rightarrow 5CO_2+7C+10H_2 \qquad \text{(Reaction 1a)}.$$

Additional reactions for hydrogen to be combusted to form water and for carbon to be combusted to form carbon dioxide are defined as below:

$$2H_2+O_2 \rightarrow 2H_2O \qquad \text{(Reaction 1b)}$$

$$C+O_2 \rightarrow CO_2 \qquad \text{(Reaction 1c)}.$$

Thermochemistry is generally a study of energy changes that occur during chemical reactions. If energy is transferred as heat at constant volume, and no work is done, the change of internal energy produced is equal to the heat transferred. For a specified change of state $\Delta U$ independent of any process, $(\Delta U)_v = q_v$, defined by the first law of thermodynamics. If energy is transferred as heat at constant pressure, the quantity of energy transferred can be identified with a change of enthalpy. Therefore, as long as no other work is being done, $\Delta H = q_p$. The enthalpy change accompanying a reaction is called the reaction enthalpy ($\Delta H$). An enthalpy of formation is the reaction enthalpy when a compound is formed from its elements. For a reaction with several reactants and products, the enthalpy change $\Delta H$ refers to the overall process as follows:

(unmixed reactants)→(unmixed products)

The reaction for which $\Delta H>0$ are called endothermic; those for which $\Delta H<0$ are called exothermic.

The table below lists the enthalpy of formation for compounds such as carbon dioxide ($CO_2$), water ($H_2O$), and cellulose ($C_6H_{10}O_5$) and the molecular weight per mole of the compounds. It also lists the specific heat of the compounds and enthalpy of vaporization of water. Such data provided in the table are used for calculations of the energy required to heat cellulose and to form water vapor at elevated temperatures.

|  | Enthalpy of Formation (kJ/mol) | Molecular Weight (gram/mol) | Specific Heat $C_p$ (J/K/mol) | Enthalpy of Vaporization (kJ/mol) |
|---|---|---|---|---|
| $CO_2$ | −393.5 | 44 | — | — |
| $H_2O$ (g) | −241.8 | 18 | 33.58 | — |
| $H_2O$ (l) | −285.8 | 18 | 75.29 | 40.7 |
| Cellulose ($C_6H_{10}O_5$) | −87.2 | 162 | 230 | — |

Referring to reaction 1a now, by using the enthalpy of formation, the energy release for 2 moles of cellulose may be estimated to be as follows:

$$\Delta H1=5(-393.5)-2(87.2)=-2141.8 \text{ kJ}$$

If the remaining hydrogen is burned to form water in Reaction 1b, additional energy released for 2 moles of cellulose may be calculated as:

$$\Delta H2=10(-241.8)=-2418.3 \text{ kJ}$$

Therefore, the energy release for 2 moles of cellulose may be $$\Delta H=\Delta H1+\Delta H2=-4560.1 \text{ kJ}$$

The energy release for 1 mole of cellulose in reactions 1a and 1b is thus −2280 kJ/mol.

If it requires an energy of 92 kJ/mol to heat cellulose, as this may be calculated by the specific heat $C_p$ and temperature change for cellulose using the following equation:

$$\Delta U=C_p \Delta T=230 \text{ J/K/mol}*400\text{K}=92,000 \text{ J/mol}=92 \text{ kJ/mol}$$

Then, the net energy release for cellulose to be burned in inert gas may be:

$$\Delta H3=-2280+92=-2188 \text{ kJ/mol}=-2188/162 \text{ kJ/g}=-13.51 \text{ kJ/g}$$

In addition, the residue of 3.5 moles of carbon (or 3.5*12=42 grams of carbon) for a mole of cellulose may be potentially burned to form carbon dioxide and to release additional energy that may be:

$$\Delta H4=-3.5*393.5=-1377.3 \text{ kJ/mol}=-1377.3/162 \text{ kJ/g}=-8.5 \text{ kJ/g}$$

The total energy release for cellulose may be estimated by:

$$\Delta H4+\Delta H3=-13.51-8.5=-22.0 \text{ kJ/g}$$

The inventors have performed experiments by using nitrogen gas instead of argon to displace air, because nitrogen gas costs less than argon gas. However, the average yield of carbon may be dropped to 17% from 20-25% when gas is switched from argon to nitrogen, which may be due to the formation of CN, or perhaps nitrogen may not displace oxygen as well as argon gas. Nonetheless, some embodiments may utilize different inert gases to displace some or all of the air within a system.

Hydrous Pyrolysis for the Production of Hydrogen from Cellulose

A possible reaction for generating hydrogen from cellulose by adding liquid water to the cellulose and heating the combination may be defined by:

$$C_6H_{10}O_5+7H_2O \rightarrow 6CO_2+12H_2 \qquad \text{(Reaction 2a)}.$$

In some embodiments, the combination may be heated to about 1000° C. This hydrous pyrolysis reaction results in the production of hydrogen. Other non-oxidation reactions may also be utilized in some embodiments to produce hydrogen. Hydrogen may be subsequently burned in oxygen defined by:

$$2H_2+O_2 \rightarrow 2H_2O \qquad \text{(Reaction 2b)}.$$

In reaction 2a, the net enthalpy of the reaction has been calculated as 1241 kJ/mol.

When the hydrogen burn in Reaction 2b is considered, the following energy may be released:

$$\Delta H=12(-241.8)=-2902 \text{ kJ/mole}.$$

Thus the net energy generation is 1661 kJ/mole cellulose. For each gram of cellulose consumed the following energy may be released:

$$\Delta H = 3108 \text{ kJ/162 g Cellulose}$$
$$= 10.25 \text{ kJ/g cellulose}.$$

The net thermal energy released by burning the hydrogen produced from cellulose via the CHyP reaction may be described as:

(10.25 kJ/g)(1,000,000 g/tonne)(1 MW-hr/3,600,000 kJ)=2.84 MW-hr/tonne.

The above analysis may show the thermodynamics of different embodiments works favorably. Embodiments may thus address many of the issues identified as problems in the gasification space.

For example, some embodiments may provide simplified designs that favor scalability over a very wide range from home unit size to commercial power production. Some embodiments may focus on the thermal issues causing heat losses that tend to make gasification technologies inefficient. Although some embodiments may produce excess heat, heat losses to the environment and through the exiting gases may be accounted for. Because of the exothermic nature, the leverage of thermal power out from the input power may be over 10.

Some embodiments may be optimized to minimize tar production as well as CO and $C_xH_y$. For some embodiments, cellulose that contains water may be a benefit, not an energy consuming issue as with most biomass energy processes in which drying of the feedstock is required to minimize water content. The feedstock in many embodiments may need not be dried before processing. By generating hydrogen on-demand in some embodiments, the benefits of hydrogen may be realized without the difficulties normally associated with hydrogen, mainly the storage and distribution issues. Because the produced gas contains $CO_2$, the dilution of the hydrogen may actually benefit the burning in an internal combustion engine in some embodiments through reduction of flame temperature and speed, and the subsequent reduction of $NO_x$ pollutants. The flame produced from combusting the product gas may contain a small amount of $C_xH_y$ and CO that makes the normally invisible flame visible, rendering the handling safer in some embodiments.

In some embodiments, lignin and/or hemi-cellulose in cellulosic biomass may also serve as effective sources of hydrogen. Since these may be waste products from several sources, in particular, cellulose to ethanol production, this could be an effective addition to the renewable energy picture using the processes described herein.

Hydrous Pyrolysis for the Production of Hydrogen from Lignin

Lignin has a nominal composition: $C_9H_{10}O_2(OCH_3)_n$ where n is the ratio MeO:C9, which is the ratio of methoxylated groups to phenylpropanoid groups in the lignin. The value of n may be roughly 0.94 for softwoods and paper, 1.18 for grasses, and 1.4 for hardwoods, merely by way of example. Using the equivalency to re-write the lignin formula may result in the following:

$$C_9H_{10}O_2(OCH_3)_n = C_{9+n}H_{10+3n}O_{2+n}.$$

In accordance with various embodiments, a CHyP hydrogen generator may drive the following reaction:

$$C_{9+n}H_{10+3n}O_{2+n}+(16+n)H_2O => (9+n)CO_2+(21+2.5n)H_2 \quad \text{(Reaction 3a)}.$$

Merely by way of example, for n=1, this corresponds to adding enough water to the lignin to bring the composition of the wet compound to 62.8 wt % water.

The net enthalpy of this reaction at 1000° C. output temperature may be described as:

$$(9+n)(-393.5)+(21+2.5n)(29.1)+1592+(16+n)(285.8)= 2008-34.95n \text{ kJ/mol}.$$

However, when the hydrogen burn is considered, the following energy may be released:

$$\Delta H=21+2.5n(-241.8)=-5078-605n \text{ kJ/mole}.$$

Thus for n=1, merely by way of example, the net energy generation is 5683-1973=3710 kJ/mole lignin. For each gram of lignin consumed the following net energy may be released:

$$\Delta H=3710 \text{ kJ}/181 \text{ g lignin}=20.5 \text{ kJ/g lignin}.$$

The net thermal energy released by burning the hydrogen produced from lignin via this reaction may be described as:

(11 kJ/g)(1,000,000 g/tonne)(1 MW-hr/3,600,000 kJ)=3.05 MW-hr/tonne.

Hydrous Pyrolysis for the Production of Hydrogen from Hemicelluloses

In some embodiments, hemicelluloses in lignocellulosic feedstocks may also serve as an effective source of hydrogen. Hemicelluloses are polysaccharides composed of sugars, that may include, but are not limited to, glucose, xylose, mannose, galactose, rhamnose, arabinose, and glucomannan. The chemical formula for these sugar building blocks may be described as $C_5H_{10}O_5$ and $C_6H_{12}O_6$. Common hemicellulosic materials in North American lignocellulosic biomass include xylan ($C_{17}H_{36}O_8$) and glucomannan ($C_{35}H_{49}O_{29}$). Because exact bond dissociation energies for the many hemicellulose polysaccharides may depend on their exact chemical composition and environments, the average values for cellulose (mass-weighted) may be used in the following analyses.

Hydrogen from Xylan

The chemical formula for xylan may be described as $C_{17}H_{36}O_8$ and the reaction driven by some embodiments may be described as:

$$C_{17}H_{36}O_8+26H_2O=17CO_2+44H_2.$$

This corresponds to adding enough water to the xylan to bring the composition of the wet compound to 56 wt % water, merely by way of example. Some embodiments may involve creating a wet compound with different water percentages.

The net enthalpy of this reaction at 1000° C. output temperature may be 3854 kJ/mol.

However, when the hydrogen burn is considered, the following energy may be released:

$$\Delta H=44(-241.8)=-10,640 \text{ kJ/mole}.$$

The net energy generation may be 10640-3854=6786 kJ/mole xylan. For each gram of xylan consumed the following energy may be released:

$$\Delta H = 6786 \text{ kJ}/368 \text{ g xylan}$$

$$= 18.44 \text{ kJ/g xylan}.$$

The net thermal energy released by burning the hydrogen produced from xylan via the CHyP reaction may be described as:

(18.44 kJ/g)(1,000,000 g/tonne)(1 MW-hr/3,600,000 kJ)=5.12 MW-hr/tonne.

Hydrogen from Glucomannon

The chemical formula for glucomannan may be described as $C_{35}H_{49}O_{29}$ and the reaction driven by some embodiments may be described as:

$$C_{35}H_{49}O_{29}+41H_2O=35CO_2+65.5H_2.$$

This corresponds to adding enough water to the glucomannan to bring the composition of the wet compound to 44.13 wt % water, merely by way of example. Some embodiments may involve creating a wet compound with different water percentages.

The net enthalpy of this reaction at 1000° C. output temperature may be 6885 kJ/mol.

However, when the hydrogen burn is considered, the following energy may be released:

$$\Delta H = 65.5(-241.8) = -15,840 \text{ kJ/mole.}$$

The net energy generation may be 15,840−6885=8955 kJ/mole glucomannan. For each gram of glucomannan consumed the following energy may be released:

$$\Delta H = 8955 \text{ kJ}/933 \text{ g glucomannan}$$

$$= 9.6 \text{ kJ/g glucomannan}$$

The net thermal energy released by burning the hydrogen produced from glucomannan via the CHyP reaction may be:

$$(9.6 \text{ kJ/g})(1,000,000 \text{ g/tonne})(1 \text{ MW-hr}/3,600,000 \text{ kJ}) = 2.67 \text{ MW-hr/tonne.}$$

The following table provides, merely by way of example, hydrogen and energy yields from biomass feedstock by biochemical component:

| Biochemical Component | Grams water required per gram component | Input Reaction Energy Required (kJ/g component) | $H_2$ Yield (g $H_2$ per gram component) | Gross Energy Yield (kJ/g component) | Net Energy Yield (kJ/g component) | Comments |
|---|---|---|---|---|---|---|
| Cellulose | 0.79 | 7.66 | 0.148 | 17.91 | 10.25 | More in hardwoods |
| Lignin | $\frac{[18(16+n)]}{[150+31n]}$ $(= 1.69, n = 1)$ | $\frac{[2008-35nn)]}{[150+31n]}$ $(= 10.9, n = 1)$ | $\frac{[21+2.5n]}{[150+31n]}$ $(= 0.13, n = 1)$ | $\frac{5078+605n}{150+31n}$ $(= 31.4, n = 1)$ | $\frac{3070+640n}{150+31n}$ $(= 20.5, n = 1)$ | $0.9 < n < 1.4$ depending on feedstock |
| Xylan | 1.27 | 10.47 | 0.239 | 28.91 | 18.44 | More in hardwoods |
| Glucomannan | 0.79 | 7.38 | 0.140 | 10.63 | 9.6 | Mostly in softwoods |

For some embodiments, an expression of expected hydrogen yields for an input lignocellulosic biomass feedstock of C % cellulose, L % lignin, X % xylan, and G % glucomannan may be determined using the following equation:

$$\text{Mass}(H_2) = \{0.148C + [(21+2.5n)/(150+31n)]L + 0.239X + 0.14G\}\text{Mass (dry feedstock)}.$$

For hybrid poplar, merely by way of example, with C=0.47, L=0.3, X=0.18, G=0.05 and n=1.3, $$\text{Mass } (H_2) = 0.148(.47) + 0.127(.3) + .239(.18) + .14(.05)$$

$$= 0.158 \text{ Mass(dry feedstock)}$$

$$\text{Net energy yield} = 10.25(.47) + 20.5(.3) + 18.44(.18) + 9.6(.05)$$

$$= 14.77 \text{ kJ/gram of dry feedstock.}$$

For Alamo switchgrass, merely by way of example, with C=0.41, L=0.27, X=0.27, G=0.05 and n=1, $$\text{Mass } (H_2) = 0.148(.41) + 0.13(.27) + .239(.27) + .14(.05)$$

$$= 0.167 \text{ Mass(dry feedstock)}$$

$$\text{Net energy yield} = 10.25(.41) + 20.5(.27) + 18.94(.27) + 9.6(.05)$$

$$= 15.33 \text{ kJ/gram of dry feedstock.}$$

Embodiments may utilize a variety of other feedstock materials that include C—O—H. The range of feed stock may include, but is not limited to: paper waste, sawdust of a wide variety of wood types, cardboard, hay, straw, switchgrass, municipal solid waste, simulated nuclear waste, demolition and construction wood waste. Some embodiments may utilize sanitized waste. In some embodiments, the materials can be changed on the fly with little loss of power or efficiency.

Merely by way of example, materials processed such as demolition and construction wood waste bond any toxic materials in the biochar may result in a >90% reduction in their waste stream while tying up the toxic materials into a form that allows safe disposal without costly leaching barriers. In addition biomass streams containing sulfur may be processed without the production of hydrogen sulfide, making the system extraordinarily useful in processing a wider than normal range of materials. For instance, it may be possible to process automotive tires in the some embodiments. With additional processing controls to tie up the chlorine, it may be possible to process PVC materials. Other materials that may be utilize include, but are not limited to: all wood types, all plastics, waste materials from Palm Oil production, sugar cane production, corn stover, and/or basically any biomass material including eventually manures.

Embodiments provide methods and systems for making liquid fuel from compounds that comprise carbon, oxygen, and hydrogen. The liquid fuel is collected, but in some embodiments a byproduct of the methods and systems includes the production of molecular hydrogen, which may also be collected and used in energy production.

Merely for purposes of illustration, certain specific reactions involving cellulose are described herein as examples of how the methods and processes disclosed may be implemented. The techniques may, however, be readily applicable more generally to C—O—H compounds and illustrations using cellulose are not intended in any way to limit the scope of the invention. For example, the techniques may be readily applicable to C—O—H compounds such as cellulosic biomass, also referred to as lignocellulose, including hemicellulose and lignin, along with cellulose, and combinations thereof.

Examples of the reactions that may be used in embodiments where the C—O—H compound comprises cellulose include, but are not limited to, the following.

Production of Methanol $$C_6H_{10}O_5 + 6H_2O \rightarrow CH_4O + 5CO_2 + 9H_2$$

$$C_6H_{10}O_5 + 5H_2O \rightarrow 2CH_4O + 4CO_2 + 6H_2$$

$$C_6H_{10}O_5 + 4H_2O \rightarrow 3CH_4O + 3CO_2 + 3H_2$$

$$C_6H_{10}O_5 + 3H_2O \rightarrow 4CH_4O + 2CO_2$$

Production of Ethanol

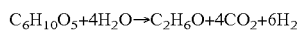

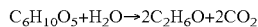

Production of Propanol

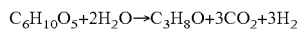

Production of Butanol

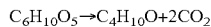

Production of Gasoline

Production of Diesel

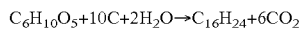

In most instances, the above reactions make use of water in addition to cellulose and may proceed by providing a wet form of the cellulose. In other instances, a source of carbon is provided with the cellulose as one of the reactants.
Systems for Extraction of Hydrogen or Liquid Fuel from C—O—H Compounds and Conversion into Electrical Power or Heat Generation Energy production from biomass generally takes one of three approaches: direct combustion of biomass for heat and/or electricity generation, pyrolytic gasification of biomass for combustion for heat and/or electricity production, or conversion of biomass into liquid fuels for future combustion. Many of these approaches start with the production of a synthesis gas, and some use the water shift reaction to enhance the reaction, particularly for the production of liquid fuels.

Because many of these technologies are well-established, there is a large body of literature regarding work completed and actively being pursued in this area. A report prepared by the Department of Energy written in 2002 titled, "Benchmarking Biomass Gasification Technologies for Fuels, Chemicals and Hydrogen Production" listed 15 of the units in use at that time. All of the processes use pyrolytic syngas systems although there are variations to the approach. They all utilize a process that results in a gas stream that generates from 4% hydrogen to 43.3% hydrogen, with the average gas stream being 15.2% hydrogen.

Indeed, the economics of biomass are sufficiently favorable such that 11 GW of electrical generation is currently utilized in the U.S. However, the bulk of that installed capacity utilizes steam generation and the average biomass plant is 20 MW with about 20% (watt-to-watt) efficiency. The operations are trending toward larger plant size to increase the efficiencies.

In addition there are several research teams that are trying to extract hydrogen from cellulose. These efforts are based around (a) microbial digestion and (b) the use of NaOH and a catalyst to facilitate a reaction that releases hydrogen and captures the carbon as sodium carbonate. More extensive efforts are being expended in several pilot facilities, to process the cellulose into ethanol.

Many companies in the food processing, wood processing, and paper processing sectors have significant byproducts of their processes which have little or negative value to their main enterprise. At the same time, electrical power costs to the industrial sector are rising at 5% per year, and with looming carbon dioxide emissions regulations, these rates promise to grow even more quickly in the coming decade. Many of the processing byproducts have to be disposed of in some manner, generating tipping fees or other disposal expenses.

Options available for distributed generation to alleviate facility energy costs are often not economical enough to significantly impact the energy budget of a facility, or to make an impact on waste stream reduction. In some cases, direct combustion of waste products is used to generate heat and steam for processes, but no generally economical renewable energy electrical generation options are available. Electricity from photovoltaics costs about $200/MWh after application of the 30% federal investment tax credit, and using diesel generators for combined-heat-and-power systems exposes the companies to fuel price fluctuations for diesel fuel, and promotes national energy dependency. The most economical systems are combined-heat-and-power (CHP) systems fueled by natural gas, and these are most common in large institutional buildings such as universities, schools, and hospitals. For commercial and industrial settings, the ability to generate electricity economically separately from process heat requirements would open significant market opportunities.

In accordance with various embodiments, a two-step process for the conversion of cellulosic biomass to hydrogen may be involved. Some embodiments include a novel type of hydrous pyrolysis process that differs from prior art processes common in scientific literature or available commercially. In one aspect, the process may be applicable to most of the components of the cellulosic biomass, including the cellulose, hemi-cellulose and lignin portions.

The clean energy system developed for this process may involve a gasifier useful for customer-sited distributed generation. The system may convert cellulosic biomass to a hydrogen-rich gas stream that can be directly combusted to produce heat and/or power. Ranging in power from 500 kW to 5 MW, merely by way of example, these systems may be sold to business customers with cellulosic biomass waste streams such as woody waste, agricultural byproducts, and paper waste. Other customers may include, but are not limited to, community-scale independent power producers, and institutions seeking affordable on-site renewable energy options.

An operating prototype of a gasifier in accordance with various embodiments may generate continuous output streams of hydrogen from multiple cellulose sources at rates up to 450 $kW_{th}$ (thermal) for an input pyrolysis power of only 12 kW, merely by way of example. The gas mixture produced may contain 65% hydrogen, 30% carbon dioxide, and 5% other components and the prototype directly feeds an electrical generator running at 9 $kW_e$ (electrical). The gas produced by the system may be higher in energy content than other pyrolysis gases, and the process is carbon-neutral with water vapor as the primary emissions component.

Some embodiments may include multiple stages that may be involved from providing a feed stock to final production of electrical generation, merely by way of example. Embodiments may involve a pyrolysis system (Cellulosic biomass to Hydrogen Pyrolysis system, or CHyP system) that may generate a hydrogen-rich gas stream from biomass as needed for power and heat generation. The measured composition of the gas stream (65% hydrogen, 30% carbon dioxide, and 5% ash, tars, and hydrocarbons) may be ideal for combustion in reciprocating engines for power generation. This gas stream may be evolved in a single process step from mechanically and chemically prepared cellulosic waste or biomass, and after removing the ash and tars the gas is fed into an internal combustion (IC) engine. The presence of $CO_2$ in the gas stream may be quite beneficial for this application, as it may act as a buffer gas, keeping temperatures in their specified range for IC engines. If the gas stream had more combustible elements than this, the resulting temperatures in the engine would rise to levels that would generate elevated $NO_x$ emissions and reduce the lifetime of the engine.

An aspect unique to some embodiments may be the ability to generate hydrogen from a feedstock at small scales (500 kW to 5 MW, for example) for distributed applications. Most other cellulose or biomass generation approaches can operate economically only at large scales. The ability to operate at any scale may address applications not available to current approaches. The potential market opportunities may include, but are not limited to: Residential: heat, electricity, or combined heat and power (CHP) systems; Merchant Power: electricity or district CHP; Hydrogen Supply: hydrogen gas; Industrial: heat, electricity, or CHP; Commercial: heat, electricity, or CHP.

Embodiments may include a simplified design that may favor scalability from distributed generation scales to commercial power production. Because of the exothermic nature of the overall process, the leverage of thermal power out from the input power may be over a factor of 20 from prior art gasification technologies that have focused on the thermal issues resulting in heat losses. Increased flexibility of input biomass sections may result from the process and equipment being tolerant to water. A beneficial byproduct of the process and equipment may be the minimization of the emission of tars. With on-site hydrogen generation, the benefits of hydrogen may be realized without the difficulties of storage and distribution issues in some embodiments. Because the CHyP syngas may contain 30% $CO_2$, the dilution of the $H_2$ may result in combustion temperatures suitable for existing internal combustion engines, keeping the $NO_x$ emissions within acceptable limits and not degrading engine components.

The process and pyrolysis unit of some embodiments may produce a hydrogen syngas that may be used to supply a hydrogen mix to an application as the gas is ready to consume. The hydrogen syngas can be burned in internal combustion engines to generate heat or electricity. This electrical generation application may be used to provide the electrical power from cellulosic biomass such as switchgrass for the integrated biorefinery operations, improving the embedded emissions balance of the resulting fuels. The electricity produced may be either used in the biorefinery plant or metered back to the grid in an amount at least equivalent to that utilized by all of the operations in the integrated biorefinery, merely by way of example. Because the hydrogen may be generated as needed, no hydrogen storage may be required for some embodiments and consequently no high pressure hydrogen storage concerns.

Some embodiments may include a condenser at the end of the CHyP hydrogen generator to capture any excess water and tars, some embodiments may utilize this design to generate liquid fuels. Some embodiments may be capable of producing alcohols where the reactions may be controlled to produce the alcohol of choice.

A principal attractive feature of some embodiments that include hydrogen extraction approach may be that the simplicity of gasifier design and a process which is continuous, allows for reproducible results, and may be easily scalable. In addition, prior developments on the CHyP process and apparatus have resulted in well-engineered feed rate technology that would enhance the quality and reproducibility of results. Sizing and milling processes for the feedstock may be initially utilized to produce prepared feedstocks for the CHyP converter but the developed processes may be translated well for use in the Cellulosic biomass to Liquid Fuel (CeLF) reactors.

A general overview of a simplified system 100-a for conversion of a C—O—H compound into hydrogen and/or liquid fuel in accordance with various embodiments is provided with FIG. 1A. The system 100-a may include a chamber 102-a, a heating system 110-a in a thermal communication with the chamber 102-a, an optional gas supply line 114-a for providing inert gas into the chamber 102-a, a water supply line 106-a for water to be added to the chamber 102-a by using valve 108-a, an exhaust line 118-a to allow the product gases (such as $H_2$ and $CO_2$, depending on the specific compound(s) used) to exit the chamber 102-a to flow into an optional gas separator 120-a, and a controller 112-a. The C—O—H compound 104-a may be disposed within the chamber 102-a. Examples of C—O—H compounds 104-a that may be found suitable for methods in accordance with various embodiments include, but are not limited to, sources of cellulose, hemicellulose, and/or sources of lignin. As described further below, some processes may use an inert gas, and the controller 112-a may control when to continuously purge chamber 102-a with inert gas by using a valve 116-a. The controller 112-a may also control the heating system 110-a to provide the elevated temperatures that the chamber needs to cause the C—O—H compound 104-a to be dissociated in the environment within the chamber 102-a. The controller 112-a may also control the rate of speed of the insertion of wetted feedstock into the chamber 102-a. The controller 112-a may further control the temperature of the heating system 110-a to convert the water in the wetted feedstock into water vapor and to heat the C—O—H compound 104-a to cause the chemical reaction of the C—O—H compound 104-a with water. The gas separator 120-a may be used to separate the products of the reaction (e.g., $H_2$ and $CO_2$ gases and perhaps other reaction products) after the gases ($H_2$, $CO_2$) exit the chamber 102-a.

During the biomass processing, the system 100-a may run at atmospheric pressure to very slightly positive pressure, up to about 10 torr positive pressure. This may serve to minimize leaks in the system and significantly reduces the risk of an escalating pressure event. In one embodiment, the system runs about 7 torr positive pressure.

In some embodiments, the water supply line 106-a may be configured such that water may be combined with the C—O—H compound to create a wet form of the compound before it is introduced into chamber 102-a. Some embodiments may include a conveyor mechanism (not shown) that may be utilized to transfer the wet compound into the chamber 102-a.

In some embodiments, the reaction product may include liquid fuel as discussed above that may then available for collection. In some embodiments, the hydrogen and/or carbon dioxide gases may be extracted as end products.

In some specific embodiments that produce hydrogen gas as an end product, the hydrogen gas can then be further used to generate electrical power or heat by different systems, or can be packaged for sales and distribution as a purified gas. In a specific embodiment, the gas supply line 114-a for providing inert gas is not present. In such a case, trace amounts of entrained air in the wetted feedstock being inserted into the chamber 102-a may react with the C—O—H compound 104-a to produce water and carbon dioxide.

Figure 1B:
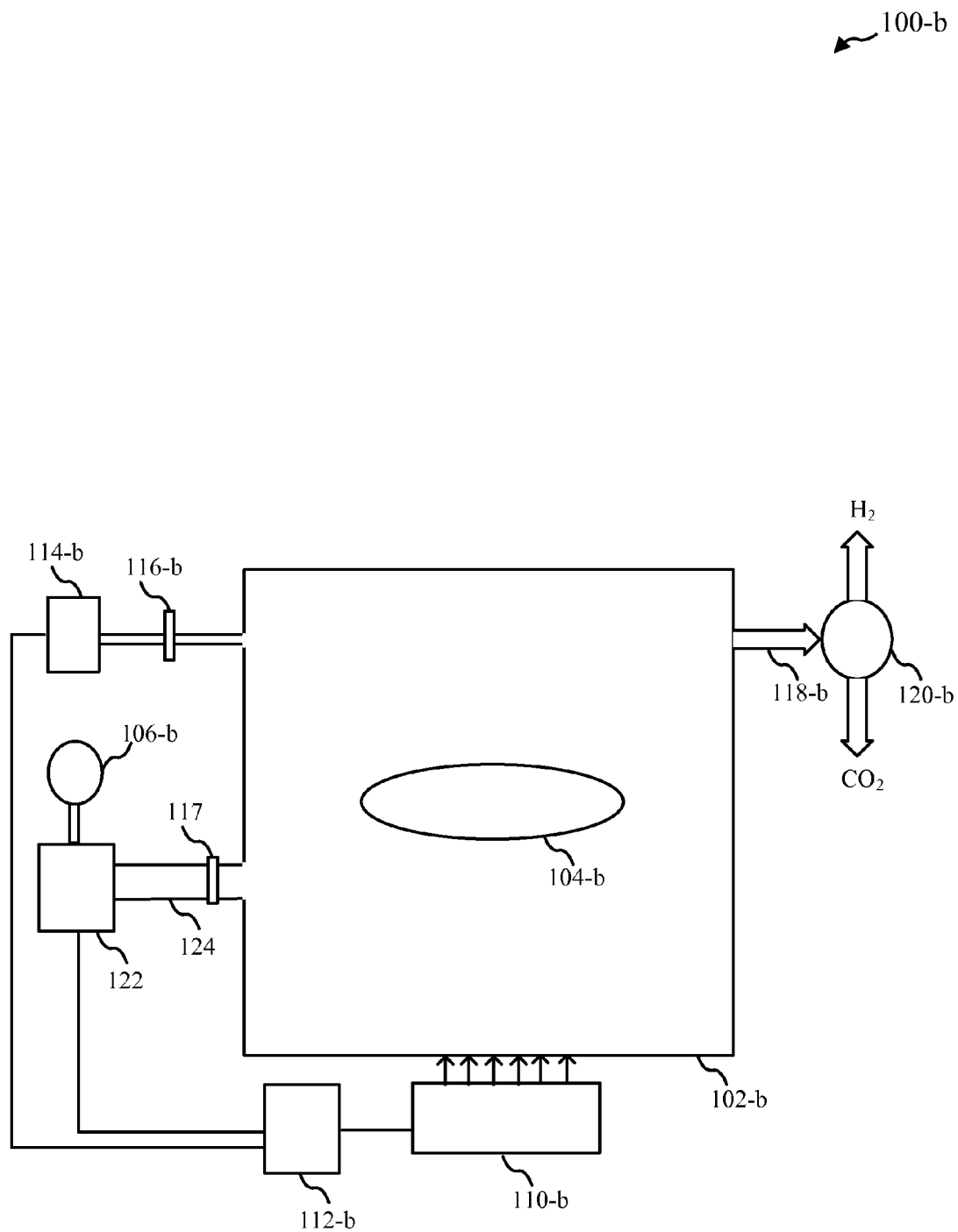
FIG. 1B is a schematic diagram of a simplified system for conversion of C—O—H compounds into hydrogen and/or liquid gas in accordance with various embodiments.

A general overview of another simplified system 100-b for conversion of a C—O—H compound into hydrogen and/or liquid fuel in accordance with various embodiments is provided with FIG. 1B. The system 100-b may include a chamber 102-b, a heating system 110-b in a thermal communication with the chamber 102-b, an optional gas supply line 114-b for providing inert gas into the chamber 102-b, a water supply line 106-b for water to be added to a C—O—H compound within the feed stock hopper or chamber 122-b, an exhaust line 118-b to allow the product gases (such as $H_2$ and $CO_2$, depending on the specific compound(s) used) to exit the chamber 102-b to flow into an optional gas separator 120-b, and/or a controller 112-b. The wet C—O—H compound 104-b may disposed within the chamber 102-b. Examples of wet C—O—H compounds 104-b that may be found suitable for methods in accordance with various embodiments include, but are not limited to, sources of cellulose, hemicellulose, and/or sources of lignin that may be made wet. As described further below, some processes may use an inert gas, and the controller 112-b controls when to continuously purge chamber 102-b with inert gas by using a valve 116-b. The controller 112-b may also control the heating system 110-b to provide the elevated temperatures that the chamber needs to cause the C—O—H compound 104-b to be dissociated in the environment within the chamber 102-b. The controller 112-b may also control the rate of speed of the insertion of wetted feedstock into the chamber 102-b. A valve 117 may be utilized in some cases. The controller 112 may further control the temperature of the heating system 110-b to convert the water in the wetted feedstock into water vapor and to heat the C—O—H compound 104-b to cause the chemical reaction of the C—O—H compound 104-b with water. The gas separator 120-b may be used to separate the products of the reaction (e.g., $H_2$ and $CO_2$ gases and perhaps other reaction products) after the gases ($H_2$, $CO_2$) exit the chamber 102-b.

During the biomass processing, the system 100-b may run at atmospheric pressure to very slightly positive pressure, up to about 10 torr positive pressure. This may serve to minimize leaks in the system and significantly reduces the risk of an escalating pressure event. In one embodiment, the system runs about 7 torr positive pressure.

In some embodiments, the water supply line 106-b may be configured such that water may be combined with the C—O—H compound to create a wet form of the compound before it is introduced into chamber 102-b, such as in feedstock hopper or chamber 122. Some embodiments may include a conveyor mechanism 124 that may be utilized to transfer the wet compound into the chamber 102-b. Some embodiments may utilize gravity to help transfer the wetted feedstock into chamber 102-b. In some cases, the wetted feedstock may be manually transferred into the chamber 102-b.

In some embodiments, the reaction product may include liquid fuel as discussed above that may then available for collection. In some embodiments, the hydrogen and/or carbon dioxide gases may be extracted as end products.

In some specific embodiments that produce hydrogen gas as an end product, the hydrogen gas can then be further used to generate electrical power or heat by different systems, or can be packaged for sales and distribution as a purified gas. In a specific embodiment, the gas supply line 114-b for providing inert gas is not present. In such a case, trace amounts of entrained air in the wetted feedstock being inserted into the chamber 102-b may react with the C—O—H compound 1044-b to produce water and carbon dioxide.

Technique for hydrogen burning to generate power and/or heat are known in the art. The entire contents of a U.S. Pat. No. 7,144,826 B2, entitled "Method and Apparatus for the Production of Process Gas That includes Water Vapor and Hydrogen Formed by Burning Oxygen in a Hydrogen-Rich Environment" by George Roters, Helmut Sommer, Genrih Erlikh, and Yehuda Pashut, are incorporated herein by reference for all purposes.

Figure 2:
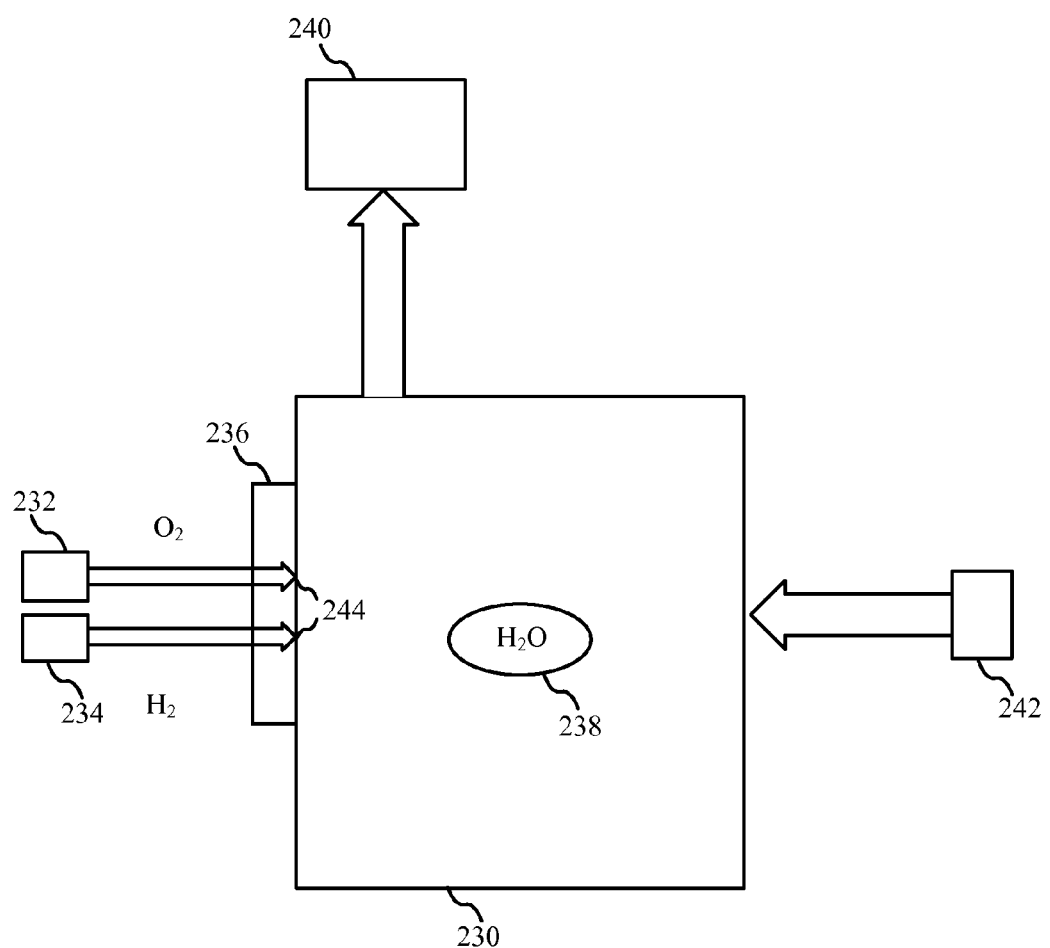
FIG. 2 is a schematic diagram of a simplified system for hydrogen to be burned in a combustion chamber in accordance with various embodiments.

For illustration purposes, a simplified exemplary system 200 for hydrogen burn is provided in FIG. 2. The system 200 comprises a combustion chamber 230, a burner 236 for igniting hydrogen burning in oxygen to form water vapor 238 and generate heat, a $H_2$ gas supply line for providing $H_2$ into the combustion chamber 230, a gas supply line for providing $O_2$ or air into the combustion chamber 230, an exhaust line 240 for water vapor steam 238 to exit the combustion chamber 230, and an inert gas supply line 242 for providing inert gas to flush the combustion chamber prior to introducing $H_2$ gas to the combustion chamber 230 in embodiments where such inert gas is used. The ratio of hydrogen gas 232 and oxygen gas 234 may be provided such that hydrogen may be thoroughly burned in oxygen. The water vapor 238 may be converted into electrical power in the converter 240 by any of several techniques known in the art. In general, instead of oxygen, an oxygen-containing gas, such as, among others, NO or $O_3$, can be used, merely by way of example. As noted, in specific embodiments, the gas supply line 242 for providing inert gas is not present. In such a case, air inside the chamber 230 may react with the C—O—H compound to produce water and carbon dioxide until the air is depleted.

After the combustion chamber is filled with hydrogen 232, the heating system 236 may be activated and now oxygen 234 may be introduced into the chamber. In the combustion chamber 230, the oxygen 234 may be introduced, for example, with a time delay of five seconds relative to hydrogen 232. The heating system 236 may heat the region near the outlet 244 to about 700° C. to ignite the combustion, merely by way of example. The ratio of the oxygen 234 to the hydrogen 232 may be provided into the combustion chamber so that the hydrogen is completely burned.

Another method of conversion of hydrogen into electrical power is using a fuel cell. A fuel cell is an electrochemical energy conversion device. It transforms chemical power into electrical power. A fuel cell can convert hydrogen and oxygen into water and produce electricity and heat. A fuel cell can also use other fuel sources than hydrogen gas, such as liquid fuel like methanol, natural gas, gasoline, and the like. A fuel cell power generation equipment comprises an anode, an electrolyte membrane, a cathode and a diffusion layer, wherein fuel is oxidized at an anode and oxygen is reduced at a cathode, such as described in U.S. Pat. No. 7,192,666 B2, entitled "Apparatus and Method for Heating Fuel Cells" by John C. Calhoon, the entire contents of which are incorporated herein by reference for all purposes.

Figure 3:
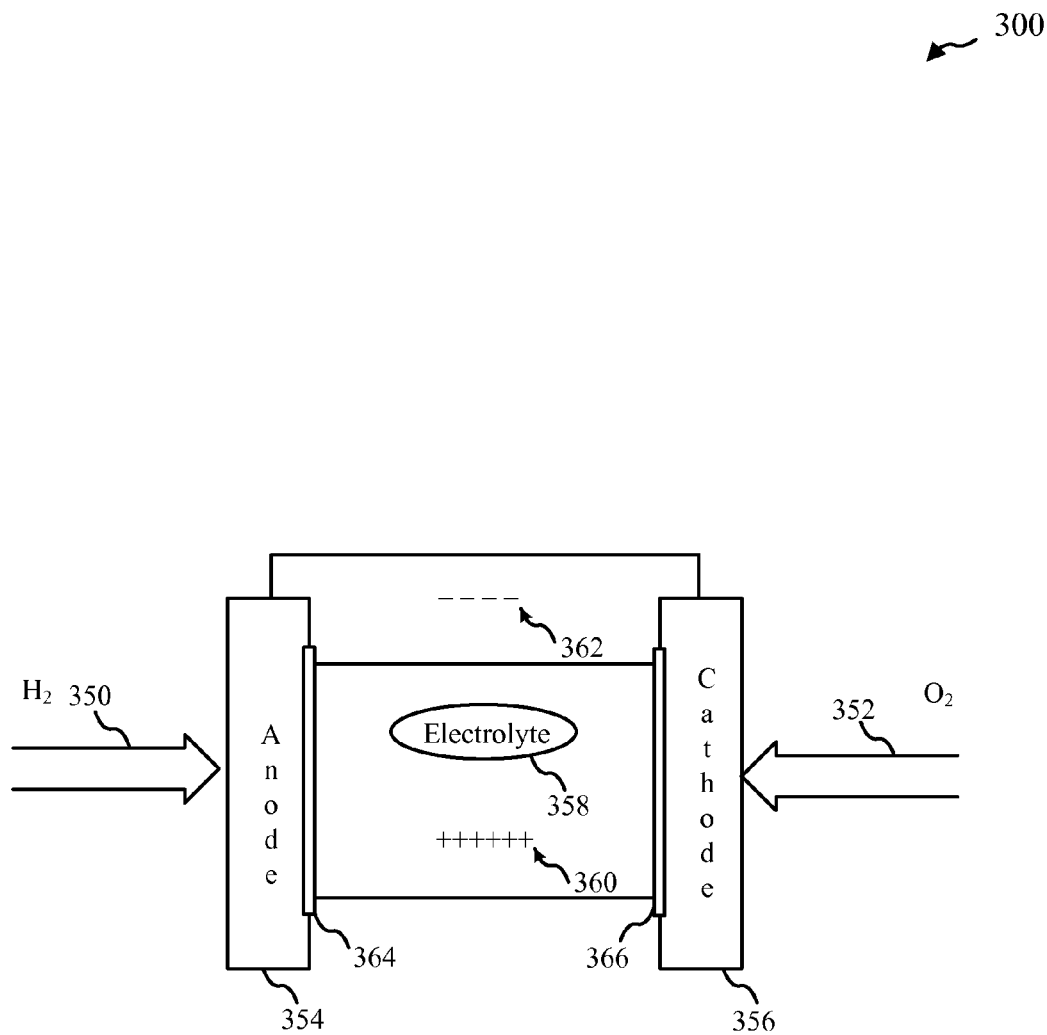
FIG. 3 is a schematic diagram of a simplified system for conversion of hydrogen gas into electrical power by a fuel cell in accordance with various embodiments.

FIG. 3 shows a simplified fuel cell system 300 for using $H_2$ gas as fuel. The system 300 comprises an anode 354, and a cathode 356, an electrolyte 358, a hydrogen gas 350 supply line, and an oxygen gas 352 supply line. Hydrogen 350 from the gas supply line may be fed to the anode 354 of the fuel cell, while oxygen 352 from the gas supply line may be fed to the cathode 356 of the fuel cell. The hydrogen 300 atoms, reacting with a catalyst 364 in the anode 354, are split into protons 360 and electrons 362. Meanwhile, an oxygen molecule 352, reacting with a catalyst 366 in the cathode 356, is split into two separate oxygen atoms bearing negative charges.

The electrolyte 358 is positioned between the anode 354 and the cathode 356. The electrolyte 358 functions as a conductor for carrying protons 360 between the anode 354 and the cathode 356. The protons 360 are permitted to pass through the electrolyte while the electrons 362 are not. The protons 360 pass through the electrolyte 358 towards the oxygen 352 in the cathode 356. The result is a build up of negative charge in the anode 354 due to the electrons 362 that are left behind. The electrical potential generated by the buildup of electrons 362 is used to supply electrical power. Meanwhile, the protons diffuse through the membrane (electrolyte) to the cathode, where a hydrogen atom is recombined at the cathode and reacted with oxygen to form water at the cathode.

There are many types of fuel cells for converting hydrogen and oxygen into water and generating electricity, for instance, among others, phosphoric acid fuel cell (PAFC), Proton Exchange Membrane (PEM), Molten Carbonate Fuel Cell (MCFC), Solid Oxide Fuel Cell (SOFC), and Alkaline Fuel Cell (AFC). The efficiencies vary from various fuel cells, ranging from 30% to 85%, merely by way of example.

The chemical reactions also vary from fuel cells. For example, the chemical equations for describing the PEM reactions in the anode, cathode, and the fuel cell may be provided as follows:

Anode: $H_2(g) \rightarrow 2H^+(aq) + 2e^-$

Cathode: $\frac{1}{2}O_2(g) + 2H^+(aq) + 2e^- \rightarrow H_2O(l)$

Fuel Cell: $H_2(g) + \frac{1}{2}O_2(g) \rightarrow H_2O(l)$.

Another example of the chemical reactions for describing the PAFC reactions is provided below:

Anode: $H_2(g) \rightarrow 2H^+(aq) + 2e^-$

Cathode: $\frac{1}{2}O_2(g) + 2H^+(aq) + 2e^- \rightarrow H_2O(l)$

Fuel Cell: $H_2(g) + \frac{1}{2}O_2(g) + CO_2 \rightarrow H_2O(l) + CO_2$.

Note that PAFCs can tolerate a low concentration of $CO_2$ of about 1.5%, which allows a broad selection of acceptable hydrogen fuels.

Processes for Conversion of Hydrogen into Electrical Power

Systems and processes in accordance with various embodiments for extracting hydrogen and converting that hydrogen into electrical power may address many of the issues identified as problems in the gasification space. A simplified system design may allow scalability over a very wide range from home unit size to commercial power production. The process may focus on thermal issues causing heat losses that tend to make gasification technologies inefficient. Although the process may produce excess heat, heat losses to the environment and through the exiting gases may be accounted for. Because of the exothermic nature, the leverage of thermal power out from the input power may be over 20.

Figure 4A:
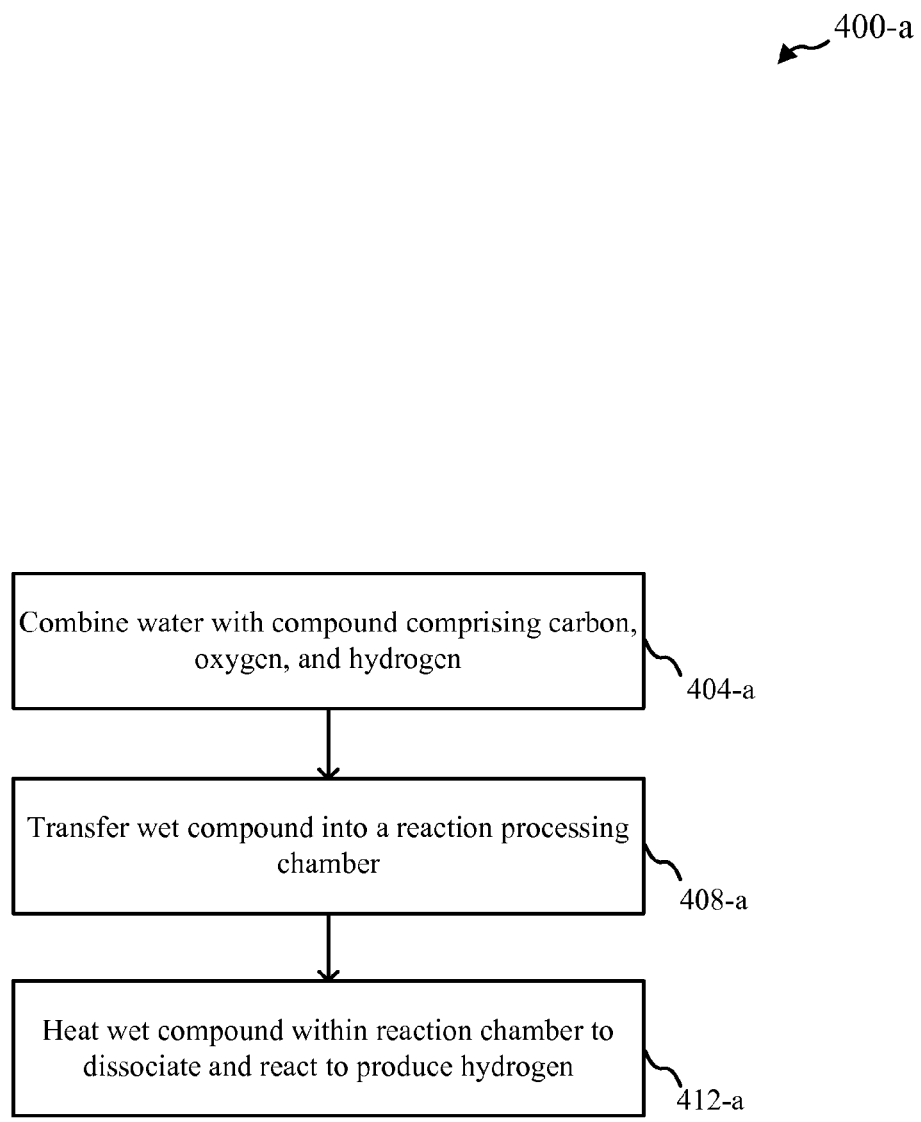
FIG. 4A is a flow diagram that summarizes general aspects of methods for converting C—O—H compounds into hydrogen for power generation in accordance with various embodiments.

FIG. 4A provides an overview of a method 400-a in accordance with various embodiments that may be used for conversion of the C—O—H compound into hydrogen for power generation. In FIG. 4A and in the other flow diagrams, the specific selection of steps shown and the order in which they are shown are intended merely to be illustrative. It is possible for certain steps to be performed in alternative orders, for certain steps to be omitted, and for certain additional steps to be added according to different embodiments of the invention. Some but not all of these variants are noted in the description that follows. Method 400-a may be implemented utilizing aspects of system 100-a of FIG. 1A, system 100-b of FIG. 1B, system 200 of FIG. 2, and/or system 300 of FIG. 3.

At block 404-a, water may be combined with the C—O—H compound, examples of which may include, but are not limited to, cellulose, hemicellulose and/or lignin. The wet compound may be transferred into a reaction processing chamber at block 408-a. These two steps provide one example of steps whose order may be changed in alternative embodiments.

At block 412-a, the wet compound is heated within the reaction chamber. Such heating may be accomplished using a variety of different techniques known to those of skill in the art, some of which have been described above for specific structural embodiments. In some instances, the compound may be heated to a temperature between 700° C. and 1100° C. although other temperatures are known by the inventors also to be effective. Heating the wet compound may cause dissociation and reaction of the dissociated elements, with typical reaction products including molecular hydrogen $H_2$ and carbon dioxide $CO_2$. The reaction(s) involved may include non-oxidation reaction, including hydrous pyrolysis.

Method 400-a may run at atmospheric pressure to very slightly positive pressure, up to about 10 torr positive pressure. This may serve to minimize leaks in the system and significantly reduces the risk of an escalating pressure event. In one embodiment, the system runs about 7 torr positive pressure.

Figure 4B:
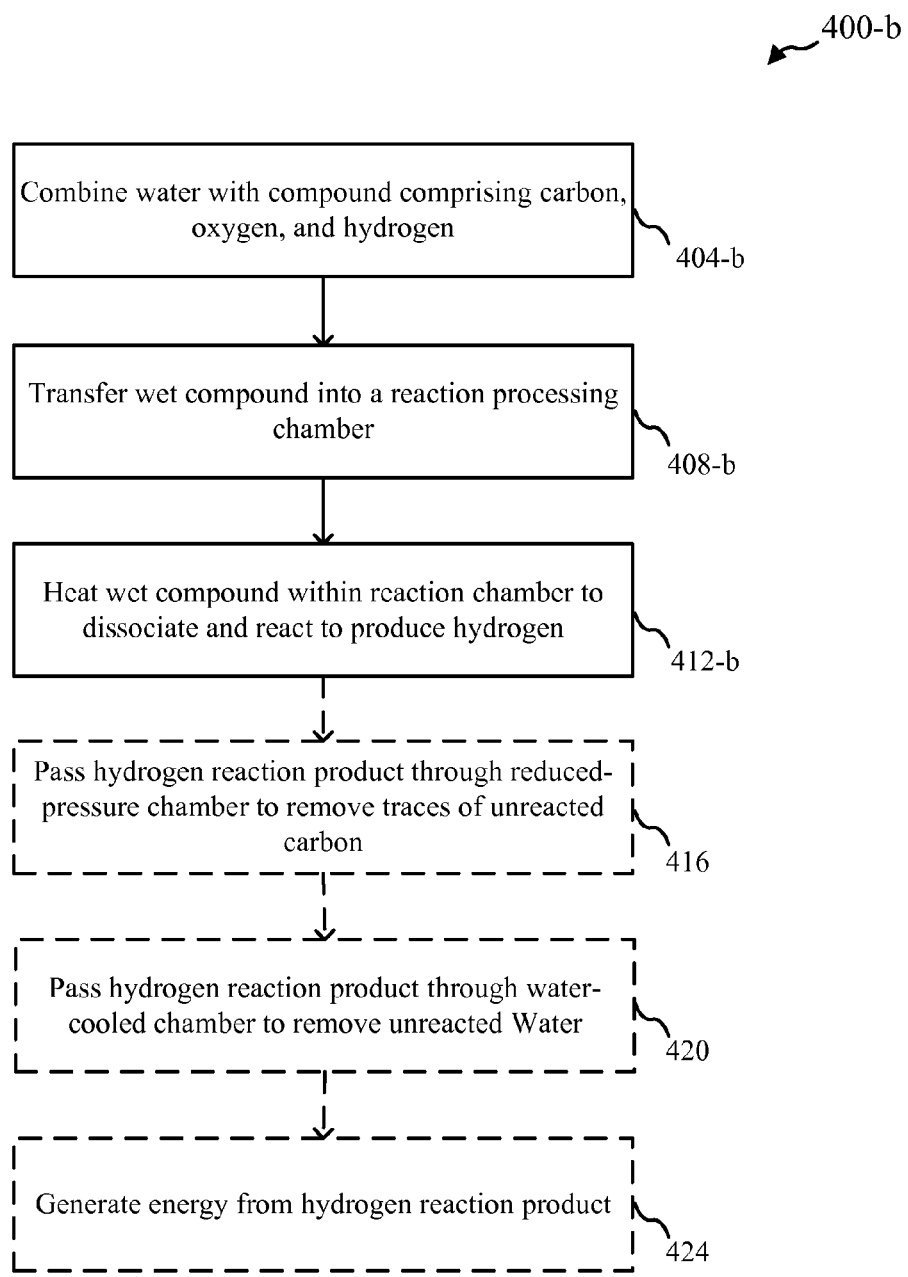
FIG. 4B is a flow diagram that summarizes general aspects of methods for converting C—O—H compounds into hydrogen for power generation in accordance with various embodiments.

FIG. 4B provides an overview of a method 400-b in accordance with various embodiments that may be used for conversion of the C—O—H compound into hydrogen for power generation. In FIG. 4B and in the other flow diagrams, the specific selection of steps shown and the order in which they are shown are intended merely to be illustrative. It is possible for certain steps to be performed in alternative orders, for certain steps to be omitted, and for certain additional steps to be added according to different embodiments of the invention. Some but not all of these variants are noted in the description that follows. Method 400-b may be implemented utilizing aspects of system 100-a of FIG. 1A, system 100-b of FIG. 1B, system 200 of FIG. 2, and/or system 300 of FIG. 3. Method 400-b may be an example of FIG. 400-A.

At block 404-b, water may be combined with the C—O—H compound, examples of which may include, but are not limited to, cellulose, hemicellulose and/or lignin. The wet compound may be transferred into a reaction processing chamber at block 408-b. These two steps provide one example of steps whose order may be changed in alternative embodiments. For example, the compound may be disposed in the reaction processing chamber in a dry state, with the "transfer" effected by combining it with water while disposed there. In still other instances, water may be applied to the compound as it is moved into the reaction processing chamber, such as by using a spray system, as part of the transfer.

At block 412-b, the wet compound is heated within the reaction chamber. Such heating may be accomplished using a variety of different techniques known to those of skill in the art, some of which have been described above for specific structural embodiments. In some instances, the compound may be heated to a temperature between 700° C. and 1100° C. although other temperatures are known by the inventors also to be effective. Heating the wet compound may cause dissociation and reaction of the dissociated elements, with typical reaction products including molecular hydrogen $H_2$ and carbon dioxide $CO_2$. The reaction(s) involved may include non-oxidation reaction, including hydrous pyrolysis. Molecular hydrogen produced within the reaction chamber may be processed at blocks 416-424, although not all of these steps need be included in many embodiments.

In particular, it is not expected that the production of hydrogen will be 100% and there may be traces of unreacted elements remaining in the reaction products. For example, passing the hydrogen reaction product through a reduced-pressure chamber at block 416 may be useful in removing traces of unreacted carbon and passing the hydrogen reaction product through a water-cooled chamber at block 420 may be useful in removing unreacted water and tars.

Once the hydrogen has been extracted from the process, it may be processed at block 424 to generate energy, such as by using a burning process, a reciprocating engine, or a fuel-cell process as described above. The hydrogen may also be utilized for other purposes in some embodiments.

Method 400-b may run at atmospheric pressure to very slightly positive pressure, up to about 10 torr positive pressure. This may serve to minimize leaks in the system and significantly reduces the risk of an escalating pressure event. In one embodiment, the system runs about 7 torr positive pressure.

Figure 5:
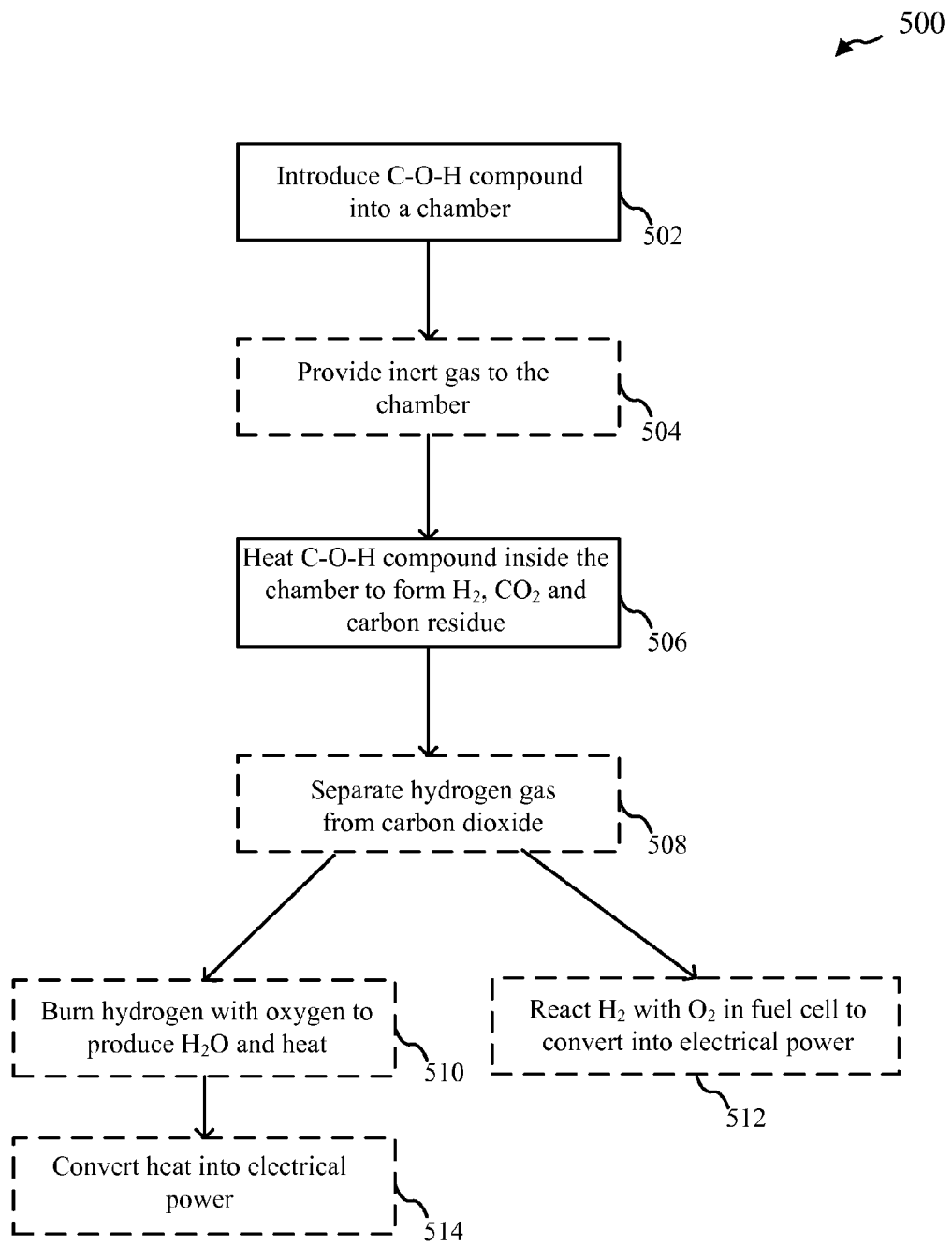
FIG. 5 is a flow diagram that summarizes a first specific method of extraction of hydrogen from cellulosic biomass and steps of conversion of hydrogen into electrical power in accordance with various embodiments.
Figure 6:
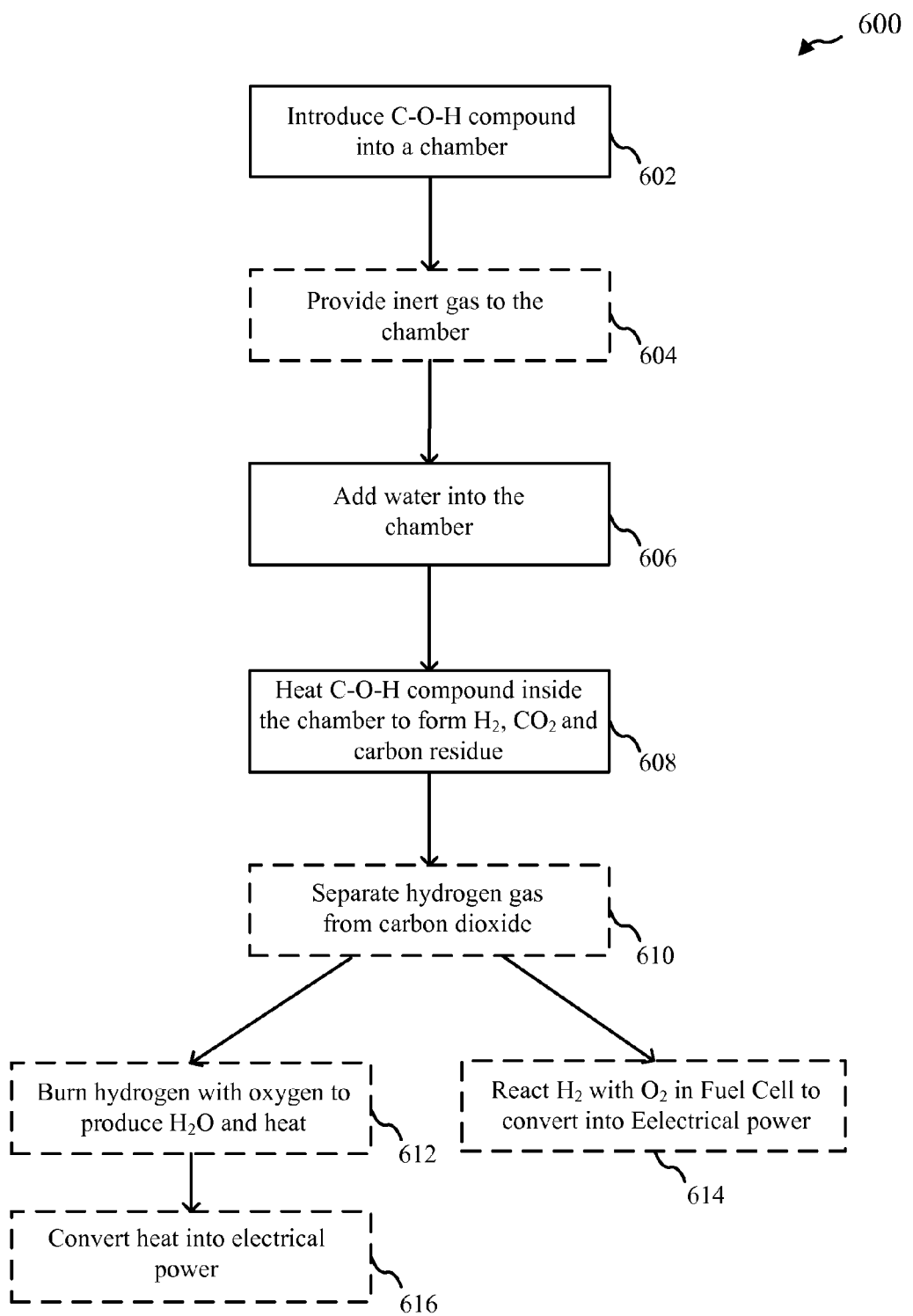
FIG. 6 is a flow diagram that summarizes a second specific method of extraction of hydrogen from cellulosic biomass and steps of conversion of hydrogen into electrical power in accordance with various embodiments.

FIG. 5 and FIG. 6 provide more specific illustrations of methods of the invention for particular embodiments. For example, FIG. 5 is a flow diagram that summarizes a first method 500 of conversion of a source of C—O—H compound such as cellulose, hemicellulose, and/or lignin into hydrogen from a reaction, such as reaction 1a, and then steps for conversion of hydrogen into electrical power. Method 500 may be implemented utilizing aspects of system 100-a of FIG. 1A, system 100-b of FIG. 1B, system 200 of FIG. 2, and/or system 300 of FIG. 3. Some methods of method 500 may utilize different reactions. The process starts at block 502 by introducing the source of C—O—H compound into a chamber. The chamber may then be flushed with inert gas to displace air in the chamber at block 504. The inert gas may comprise argon, nitrogen, helium, and the like. In a specific embodiment of the invention, no inert gas is introduced into the chamber so that the chamber is filled with air. In a specific embodiment, the wetted cellulosic feedstock is continuously moved through the heating chamber, and no inert gas is used, and the geometry of the chamber minimizes the presence of air in the chamber. The air may react with the C—O—H compound until the air is depleted inside the chamber. The chamber containing the source of C—O—H compound may be heated to cause dissociation of the C—O—H compound at block 506. The dissociation may result in forming hydrogen gas, carbon dioxide, carbon monoxide, other hydrocarbons, and carbon residue. The hydrogen gas may be separated from the carbon dioxide gas at block 508 by techniques known in the art. The diagram shows two possible ways of conversion of hydrogen into electrical power, though other ways may be utilized. One way of conversion of hydrogen into electricity is to react hydrogen with oxygen in a fuel cell at block 512. Another way of conversion of hydrogen into electrical power is to burn hydrogen gas in oxygen in a combustion chamber at block 510, so that water vapor is formed along with heat release. The water vapor may then be fed into an energy converter such as an expansion turbine for producing electricity from thermal energy at block 514 by techniques known in the art.

FIG. 6 is a flow diagram that summarizes a second method 500 of conversion of a source of C—O—H compound into hydrogen from a reaction, such as reaction 2a, and steps for conversion of hydrogen into electrical power. Method 600 may be implemented utilizing aspects of system 100-a of FIG. 1A, system 100-b of FIG. 1B, system 200 of FIG. 2, and/or system 300 of FIG. 3. Method 600 may utilize other reactions in some embodiments. The process starts at block 602 by introducing the source of C—O—H compound into a chamber. The chamber may then be flushed with inert gas to displace air in the chamber at block 604. The inert gas may comprise argon, nitrogen, helium, and the like. In a specific embodiment, no inert gas is introduced into the chamber so that the chamber is filled with air. The air reacts with cellulose, hemicellulose, and/or lignin until the air may be depleted inside the chamber.

Water may then be added into the chamber at block 606, as water may be needed to react with the C—O—H compound to form hydrogen and carbon dioxide. The water in the form of liquid may be heated to be changed to water vapor, and the chamber containing the source of C—O—H compound is heated to a temperature at which the C—O—H compound may react with the water vapor at block 608. In a specific embodiment, the wetted cellulosic feedstock is continuously moved through the heating chamber, and no inert gas is used, and the geometry of the chamber minimizes the presence of air in the chamber. The reaction of C—O—H compound and water results in forming a hydrogen gas and a carbon dioxide gas. The hydrogen gas needs to be separated from the carbon dioxide gas at block 610 by techniques known in the art.

The diagram shows two possible ways of conversion of hydrogen into electrical power, though other ways may be also utilized. One way of conversion of hydrogen into electricity is to react hydrogen with oxygen in a fuel cell at bock 614. Another way of conversion of hydrogen into electrical power is to burn hydrogen gas in oxygen in a combustion chamber at block 612, so that water vapor is formed along with heat release. The water vapor may then be fed into an energy converter for producing electricity from thermal energy at block 616 by techniques known in the art.

The cellulose reactions 2a and 2b may have several unique features for automotive applications. First of all, by utilizing the waste heat from the engine to heat up the reaction chamber for hydrogen production, it may potentially recapture the energy of 487 kJ/mol that is the heat used to form water vapor at 400° C. and to heat cellulose as discussed above. This may improve the energy output by 17% that is equal to (487 kJ/mol)/(2902 kJ/mol).

Furthermore, the water vapor generated from hydrogen burn in reaction 2b may be re-circulated into the hydrogen generation chamber so that the water usage would only be the initial one to start the cellulose process. As shown in reactions 2a and 2b, 12 moles of water are released from each mole of cellulose converted. If the water from reaction 2b is reused without any loss, 5 net moles of water are created from cellulose in reactions 2a and 2b, merely by way of example. By proper use and capture of the generated water from reaction 2b, no net water may be needed in sustaining the cellulose reaction process. This may eliminate an initial concern that the weight of 126 g (7 moles) of water for 162 g (1 mole) of cellulose in Reaction 2a would be an additional burden to the automobiles.

Additionally, the system for conversion of cellulose into hydrogen for power generation may reduce the production of carbon dioxide generation, when compared to the use of gasoline. This may help with easing the concern of global warming issue. For 1 mile per kW-hr as discussed earlier on, the carbon dioxide release in reaction 2a for one mole of cellulose may be estimated by:

(6×44 g $CO_2$)/(12×2 g $H_2$)=11 g $CO_2$/g $H_2$ (11 kg $CO_2$/kg $H_2$)/(33.6 kW-hr/kg $H_2$)/(1 mile/kW-hr)=0.33 kg $CO_2$/mile.

In contrast, gasoline can release about 9 kg carbon dioxide per gallon. Merely by way of example, if a car gets 28 miles/gallon gasoline, the carbon dioxide release from 1 mole of cellulose may be equal to: 28 miles/gallon×0.33 kg $CO_2$/mile=9.24 kg $CO_2$/gallon. This is approximately equivalent to that released from gasoline. However, the cellulose process is renewable. If it is possible to achieve 5 miles/kW-hr $H_2$ that is 5 times of the conservative estimation of 1 mile/kW-hr $H_2$, then the hydrogen burn would be the equivalent to 5×28=140 miles/gallon gasoline equivalent release of carbon dioxide. Therefore, relatively less carbon dioxide may be produced from hydrogen burn.

The process for conversion of cellulosic biomass into hydrogen may enhance the recycling of cellulosic biomass products and turn its waste into power generation. For instance, the waste of cellulosic biomass includes forest floors that currently are not economical to recover, but present a serious fire hazard. If it becomes economical to recycle the cellulosic biomass waste through the use of the present invention, the hazard problem may be reduced. Other cellulosic biomass waste that currently ends up in the land fills may also be utilized through recycling.

Processes for Making Liquid Fuel from Cellulose or Other C—O—H Compounds

Figure 7:
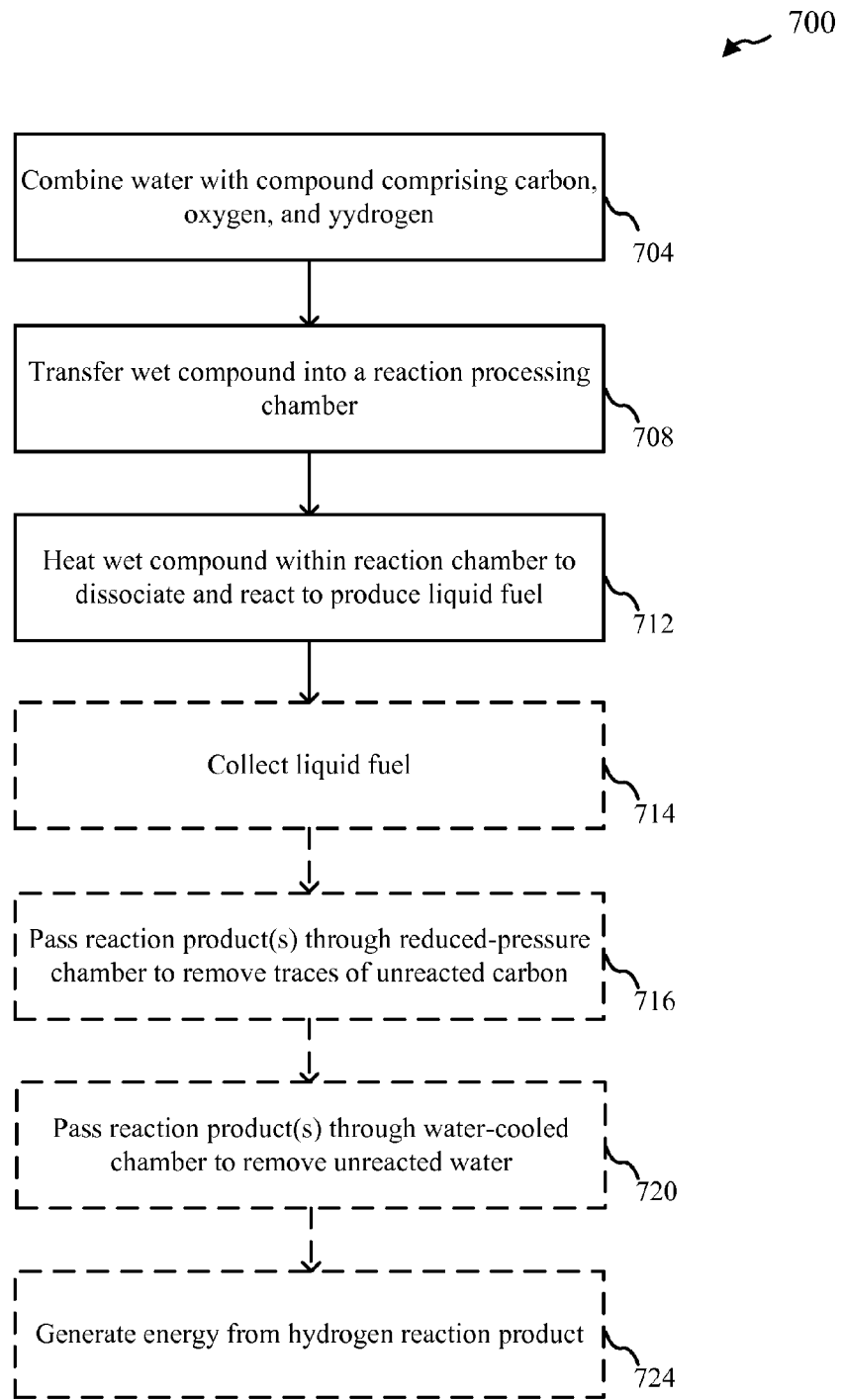
FIG. 7. is a flow diagram that summarizes general aspects of methods for making liquid fuels from C—O—H compounds such as cellulose, lignin, and/or hemicelluloses in accordance with various embodiments.

FIG. 7 provides an overview of a method 700 that may be used for making liquid fuel from the cellulose or other C—O—H compounds, such as lignin or hemicellulose, or combinations thereof. Method 700 may be implemented utilizing aspects of system 100-a of FIG. 1, system 100-b of FIG. 1B, system 200 of FIG. 2, and/or system 300 of FIG. 3. In FIG. 7, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows.

At block 704 of FIG. 7, water may be combined with the cellulose or other C—O—H compound such as hemicellulose or lignin, or combinations thereof. The wet compound may be transferred into a reaction processing chamber at block 708. These two steps provide one example of steps whose order may be changed in alternative embodiments. For example, the compound may be disposed in the reaction processing chamber in a dry state, with the "transfer" effected by combining it with water while disposed there. In still other instances, water may be applied to the compound as it is moved into the reaction processing chamber, such as by using a spray system, as part of the transfer.

At block 712, the wet compound may be heated within the reaction chamber. Such heating may be accomplished using a variety of different techniques known to those of skill in the art, some of which have been described above for specific structural embodiments. In some instances, the compound is heated to a temperature between 700° C. and 1100° C. although other temperatures are known by the inventors also to be effective. Heating the wet compound causes dissociation and reaction of the dissociated elements, with typical reaction products including molecular hydrogen $H_2$ and carbon dioxide $CO_2$ in addition to the liquid fuel. The specific reaction products depend on the reaction mechanisms used, examples of which were provided above. The liquid fuel may be collected at block 714.

In those embodiments in which molecular hydrogen that is produced within the reaction chamber is further processed, those steps indicated at blocks 716-724 may be performed, although these steps are not included in every embodiment. They are accordingly indicated with broken lines.

In particular, it is not expected that the production of liquid fuel will be 100% and there may be traces of unreacted elements remaining in the reaction products. For example, passing the liquid-fuel reaction product through a reduced-pressure chamber at block 716 may be useful in removing traces of unreacted carbon and passing the liquid-fuel reaction product through a water-cooled chamber at block 720 may be useful in removing unreacted water.

Once the hydrogen has been extracted as an end product from the process, it may be processed at block 724 to generate energy, such as by using a burning process or a fuel-cell process as described above. In some embodiments, the carbon dioxide gas may also be extracted as an end product.

Other Potential Applications

The process for making liquid fuel from cellulose or other C—O—H compounds, such as hemicellulose or lignin, or combinations thereof, may enhance the recycling of cellulosic biomass products and turn cellulosic waste into liquid fuel and to be used for energy production. For example, the waste of cellulosic biomass includes forest floors that currently may not be economical to recover, but present a serious fire hazard. Recycling this cellulosic waste through the use of different embodiments may reduce this hazard problem. Other cellulosic waste that currently ends up in the land fills may also be utilized through recycling. Other applications are also possible within the scope of different embodiments.

Continuous Liquid Fuel Production from Biomass

Methods, systems, and devices for continuous production of liquid fuels from biomass are provided. Some embodiments utilize a thermochemical process to produce a bio-oil in parallel with a thermochemical process to produce a hydrogen-rich synthesis gas. Both product streams may be fed into a third reaction chamber that may enrich the bio-oil with the hydrogen gas, for example, in a continuous production process. One product stream may include a liquid fuel such as diesel. Some embodiments may also produce other product streams including, but not limited to, electrical power generation and/or biochar.

Figure 8A:
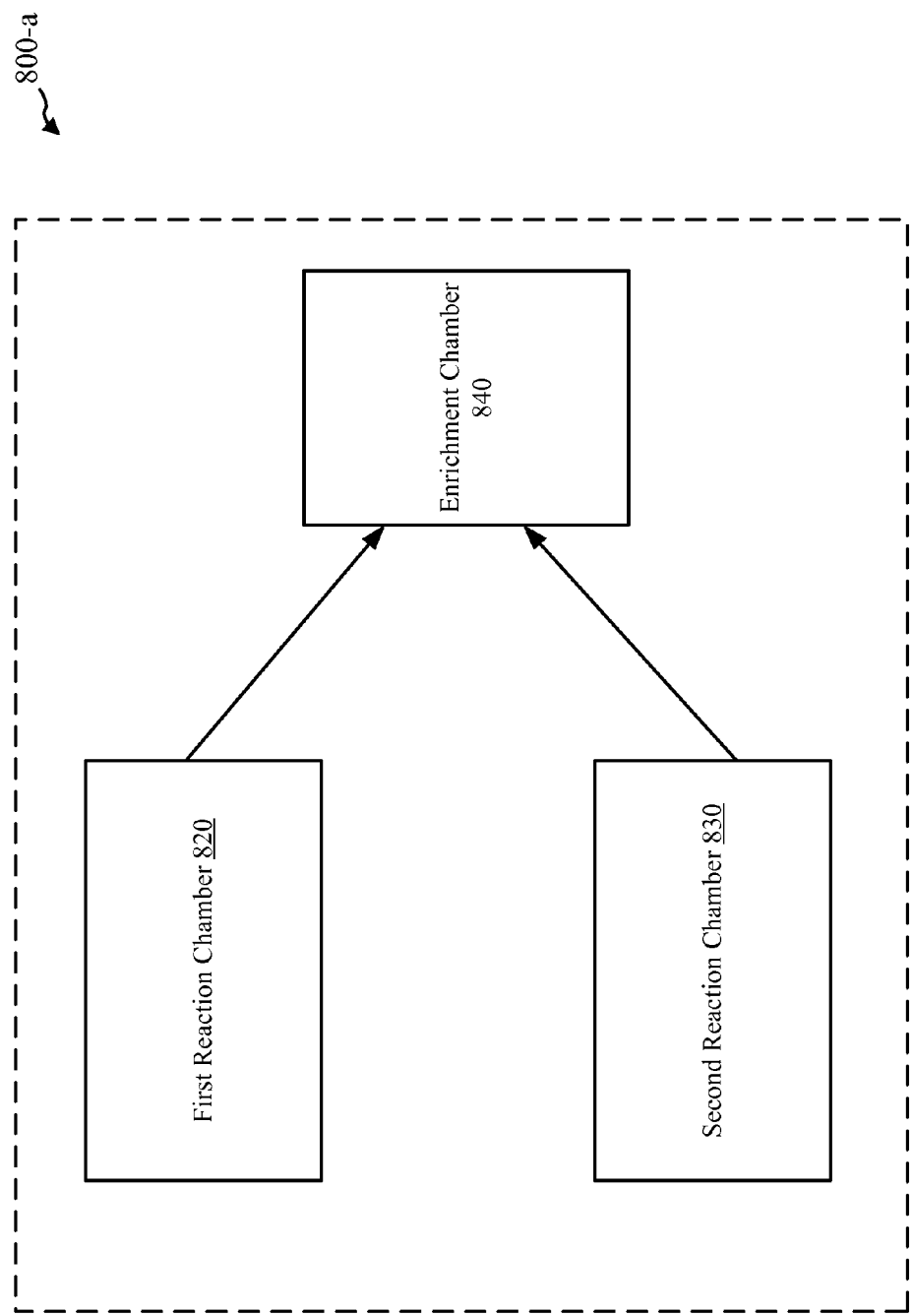
FIG. 8A shows a continuous liquid fuel production system in accordance with various embodiments.

A general overview of a system 800-a for continuous liquid fuel production from biomass in accordance with various embodiments is provided with FIG. 8A. Aspects of system 800-a may utilize aspects of systems such as system 100-a of FIG. 1A and/or system 100-b of FIG. 1B, system 200 of FIG. 2 and/or system 300 of FIG. 3. System 800-a may utilized the methods discussed throughout this application, including method 400-a of FIG. 4A, method 400-b of FIG. 4B, method 500 of FIG. 5, method 600 of FIG. 6, method 700 of FIG. 7, method 900-a of FIG. 9A, and/or method 900-b of FIG. 9B.

System 800-a may include a first reaction chamber 820 configured to produce a synthesis gas, which may include hydrogen gas, from a first biomass stream. A second reaction chamber 830 configured to produce bio-oil from a second biomass stream may be included in system 800-b. An enrichment chamber 840 may also be provided that may be coupled with the first reaction chamber 820 and the second reaction chamber 830. The enrichment chamber 830 may be configured to: receive the produced the synthesis gas, which may include hydrogen gas, from the first reaction chamber; receive the produced bio-oil from the second reaction chamber; and/or enrich the produced bio-oil with the produced synthesis gas, which may include hydrogen, to produce a liquid fuel. The first biomass stream and the second biomass stream may be part of the same or different biomass stream. Each biomass stream may include a wide variety of biomass.

In general, each biomass stream includes materials that include carbon, oxygen, and hydrogen. Merely by way of example, the first biomass stream and the second biomass stream may include, but are not limited to: lignin, cellulose, hemi-cellulose, palm oil, fatty acids, and/or other C—O—H compounds, some of which are discussed herein.

The first reaction chamber 820 may be configured to produce synthesis gas that may include hydrogen. The first reaction chamber 820 may produce synthesis gas in a variety of ways, including, but not limited to the method 400-*a* of FIG. 4A, method 400-*b* of FIG. 4B, method 500 of FIG. 5, method 600 of FIG. 6, and/or method 700 of FIG. 7. The first reaction chamber 820 may also produce synthesis gas, which may include hydrogen, utilizing other techniques. The second reaction chamber 830 may produce bio-oil, for example, utilizing a variety of processes, including, but not limited to fast pyrolysis and/or flash pyrolysis. Different techniques of fast pyrolysis, for example, may be utilized, including, but not limited to: bubbling fluidized bed, circulating fluidized beds and/or transport reactor, rotating cone pyrolyzer, ablative pyrolyzer, vacuum pyrolysis, and/or auger reactor. The first reaction chamber 820 and the second reaction chamber 830 may be configured to operate concurrently, which may facilitate continuous liquid fuel production utilizing the enrichment chamber 840.

In some embodiments, the enrichment chamber 840 is configured to produce diesel as a liquid fuel. Other embodiments may produce other liquid fuels. The enrichment chamber 840 may be configured to perform different processing including, but not limited to hydrotreating and/or hydrocracking. In some embodiments, the enrichment chamber 840 may also be configured to perform a standard distillation process.

The first reaction chamber 820 may be configured to produce the hydrogen gas from a wet form the first biomass stream. In some embodiments, the first reaction chamber 820 is configured to operate under atmospheric pressure conditions. The first reaction chamber 820 may be configured to produce hydrogen from the first biomass stream through a non-oxidation reaction. The non-oxidation reaction may include a hydrous pyrolysis reaction.

Along with producing liquid fuel, synthesis gas, and/or bio-oil, system 800-*b* may be configured to produce and/or capture electrical power, heat, and/or biochar.

Figure 8B:
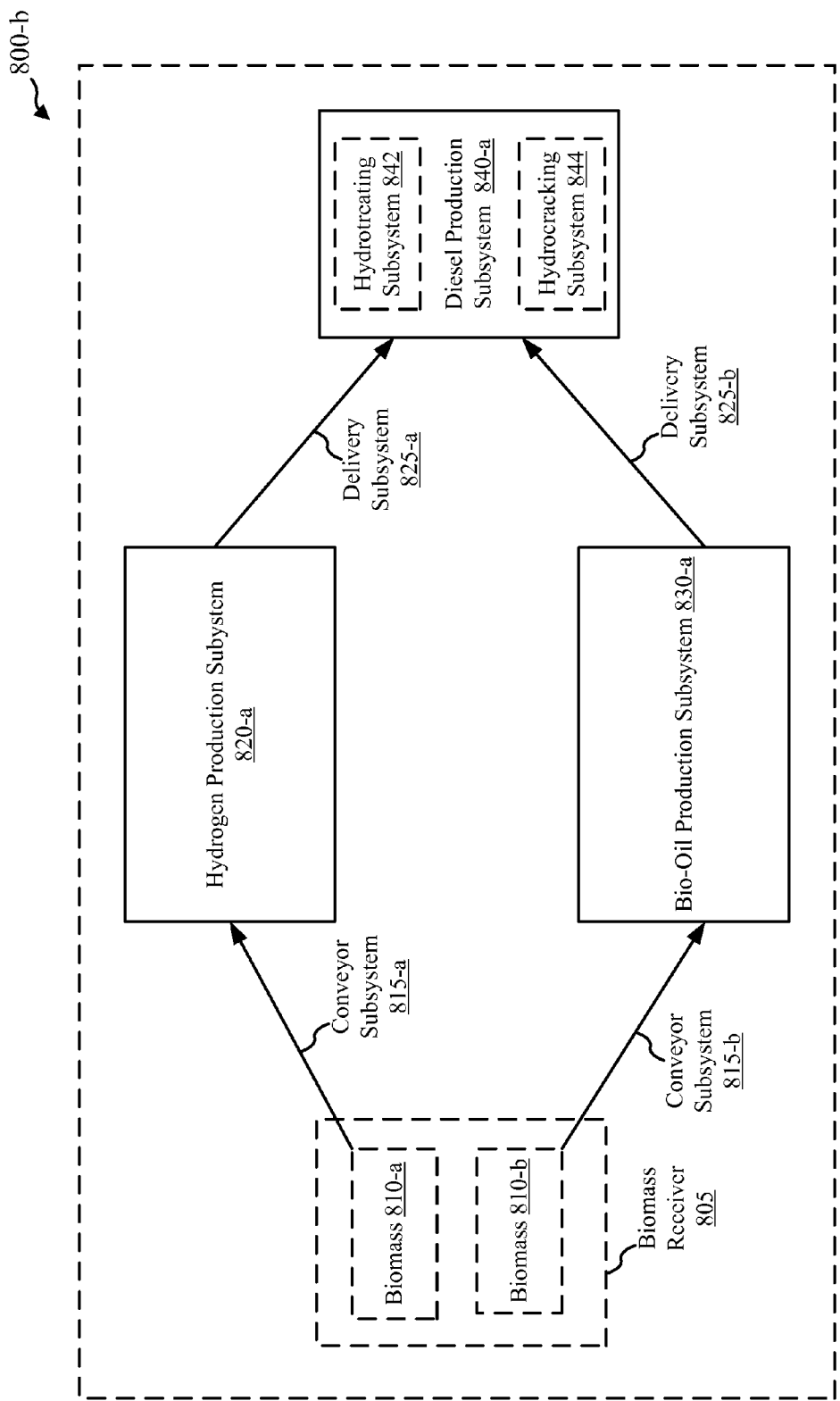
FIG. 8B shows a continuous liquid fuel production system in accordance with various embodiments.

A general overview of a system 800-*b* continuous liquid fuel production from biomass in accordance with various embodiments is provided with FIG. 8B. System 800-*b* may be an example of system 800-*a* of FIG. 8A. Aspects of system 800-*b* may utilize aspects of systems such as system 100-*a* of FIG. 1A and/or system 100-*b* of FIG. 1B, system 200 of FIG. 2 and/or system 300 of FIG. 3. System 800-*b* may utilized the methods discussed throughout this application, including method 400-*a* of FIG. 4A, method 400-*b* of FIG. 4B, method 500 of FIG. 5, method 600 of FIG. 6, method 700 of FIG. 7, method 900-*a* of FIG. 9A, and/or method 900-*b* of FIG. 9B.

System 800-*b* may include a hydrogen production subsystem 820-*a*. The hydrogen production subsystems 820-*a* may be an example of the first reaction chamber 820 of FIG. 8A. The hydrogen production subsystems 820-*a* may be configured to produce hydrogen gas from a first biomass 810-*a*. System 800-*b* may include a bio-oil production subsystem 830-*a*. The bio-oil production subsystem 830-*a* may be an example of the second reaction chamber 830 of FIG. 8A. The bio-oil production subsystem 830-*a* may be configured to produce bio-oil from a second biomass 810-*a*. The first biomass 810-*a* and the second biomass 810—may be part of the same or different biomass streams. Each biomass may include a wide variety of biomass. In general, each biomass stream includes materials that include carbon, oxygen, and hydrogen. Merely by way of example, the biomass 810-*a* and/or 810-*b* may include, but are not limited to: lignin, cellulose, hemi-cellulose, palm oil, fatty acids, and/or other C—O—H compounds, some of which are discussed herein.

One or more biomass receivers 805 configured to receive the biomass 810-*a* and/810-*b* One or more conveyor subsystems 815-*a* and/or 815-*b* may be configured to deliver one or more portions of the biomass 810-*a* and/or 810-*b* to the hydrogen production subsystem 820-*a* and/or the bio-oil production subsystem 830-*a*. The hydrogen production subsystem 820-*a* and the bio-oil production subsystem 830-*a* may be configured to operate concurrently, which may facilitate continuous liquid fuel production utilizing the diesel production subsystem 840-*a*.

The hydrogen production subsystem 820-*a* may be configured to produce synthesis gas that includes hydrogen. The hydrogen production subsystem 820-*a* may produce hydrogen gas in a variety of ways, including, but not limited to the method 400-*a* of FIG. 4A, method 400-*b* of FIG. 4B, method 500 of FIG. 5, method 600 of FIG. 6, and/or method 700 of FIG. 7. The hydrogen production subsystem 820-*a* may also produce hydrogen gas utilizing other techniques. The bio-oil production subsystem 830-*a* may produce bio-oil, for example, utilizing a variety of processes, including, but not limited to fast pyrolysis and/or flash pyrolysis. Different techniques of fast pyrolysis, for example, may be utilized, including, but not limited to: bubbling fluidized bed, circulating fluidized beds and/or transport reactor, rotating cone pyrolyzer, ablative pyrolyzer, vacuum pyrolysis, and/or auger reactor.

In some embodiments, system 800-*b* includes a source of water (not shown) configured to mix with the biomass 810-*a*. Some embodiments include mixing chamber (not shown) configured to mix water from the source of water with the biomass 810-*a* to create a wet biomass; in some cases, the mixing chamber may be coupled with the first reaction chamber 820-*a*. The conveyor subsystem 815-*a* may be configured to deliver the wet biomass to the hydrogen production subsystem 820-*a* in some embodiments. The source of water and/or mixing chamber may be included as part of the hydrogen production subsystem 820-*a* in some embodiments. The hydrogen production subsystem 820-*a* may be configured to produce the hydrogen gas from a wet form the biomass 810-*a* In some embodiments, the hydrogen production subsystem 820-*a* is configured to operate under atmospheric pressure conditions. The hydrogen production subsystem 820-*a* may be configured to produce hydrogen from the biomass 810-*a* through a non-oxidation reaction. The non-oxidation reaction may include a hydrous pyrolysis reaction.

System 800-*b* may include a diesel production subsystem 840-*a*, which may be an example of the enrichment chamber 840 of FIG. 8A. The diesel production subsystem 840-*a* may be coupled with the hydrogen production subsystem 820-*a* and the bio-oil production subsystem 830-*a*. A delivery system 825-*a* and/or a delivery subsystem 825-*b* may be utilized to deliver hydrogen gas and/or bio-oil, respectively, from the hydrogen gas production subsystem 820-*a* and/or the bio-oil production subsystem 830-*a* to the diesel production subsystem 840-*a*. The diesel production subsystem 840-*a* may be configured to: receive the produced hydrogen gas from the hydrogen gas production subsystem 840-*a*; receive the produced bio-oil from the bio-oil production subsystem system 830-a; and/or enrich the produced bio-oil with the produced hydrogen to produce a liquid fuel. The diesel production subsystem 840-a may be configured to perform different processing including, but not limited to hydrotreating (which may utilize the hydrotreating subsystem 842) and/or hydrocracking (which may utilize the hydrocracking subsystem 844). In some embodiments, the diesel production subsystem 840-a may also be configured to perform a standard distillation process.

Along with producing diesel and/or other liquid fuels, system 800-b may be configured to produce and/or capture electrical power, heat, and/or biochar.

Figure 9A:
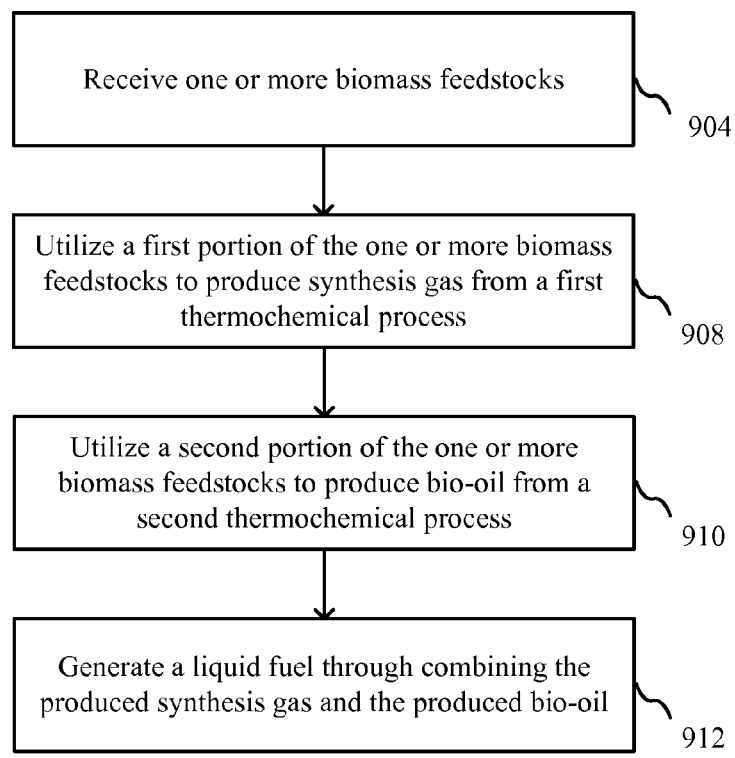
FIG. 9A is a flow diagram for continuous liquid fuel production utilizing biomass in accordance with various embodiments.

FIG. 9A provides an overview of a method 900-a of continuous liquid fuel production utilizing biomass in accordance with various embodiments. Method 900-a may be implemented utilizing aspects of system 100-a of FIG. 1, system 100-b of FIG. 1B, system 200 of FIG. 2, system 300 of FIG. 3, system 800-a of FIG. 8A, and/or system 800-b of FIG. 8B. In FIG. 9A, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows.

At block 904, one or more biomass feedstocks may be received. At block 908, a first portion of the one or more biomass feedstocks may be utilized to produce synthesis gas from a first thermochemical process. At block 910, a second portion of the one or more biomass feedstocks may be utilized to produce bio-oil from a second thermochemical process. At block 912, a liquid fuel may be generated through combining the produced synthesis gas and the produced bio-oil. The produced synthesis gas may include hydrogen gas.

The first thermochemical process may include: combining water with the first portion of the one or more biomass feedstocks to from a wet biomass feedstock; transferring the wet biomass feedstock to a reaction chamber; and/or heating the wet biomass feedstock within the reaction chamber such that the elements of the wet biomass feedstock dissociate and react to form at least the synthesis gas, which may include hydrogen gas. The elements comprises by the wet biomass feedstock may dissociate and react through a non-oxidation reaction to form at least the synthesis gas that may include hydrogen gas. The non-oxidation reaction may include a hydrous pyrolysis reaction. In some embodiments, the one or more biomass feedstocks include at least cellulose, lignin, or hemicellulose. Some embodiments may utilize other techniques for generating the synthesis gas, that may include hydrogen gas.

The second thermochemical process may include a fast pyrolysis and/or a flash pyrolysis process. Different techniques of fast pyrolysis, for example, may be utilized, including, but not limited to: bubbling fluidized bed, circulating fluidized beds and/or transport reactor, rotating cone pyrolyzer, ablative pyrolyzer, vacuum pyrolysis, and/or auger reactor. Other methods for creating bio-oil may also be utilized.

Generating the liquid fuel through combining the produced synthesis gas and the produced bio-oil may include a hydrotreating process. Generating the liquid fuel through combining the produced synthesis gas and the produced bio-oil may include a hydrocracking process. Other processes from generating liquid fuel from hydrogen and bio-oil may be utilized.

In some embodiments, the first thermochemical process and the second thermochemical process are performed concurrently and/or at a common location.

Figure 9B:
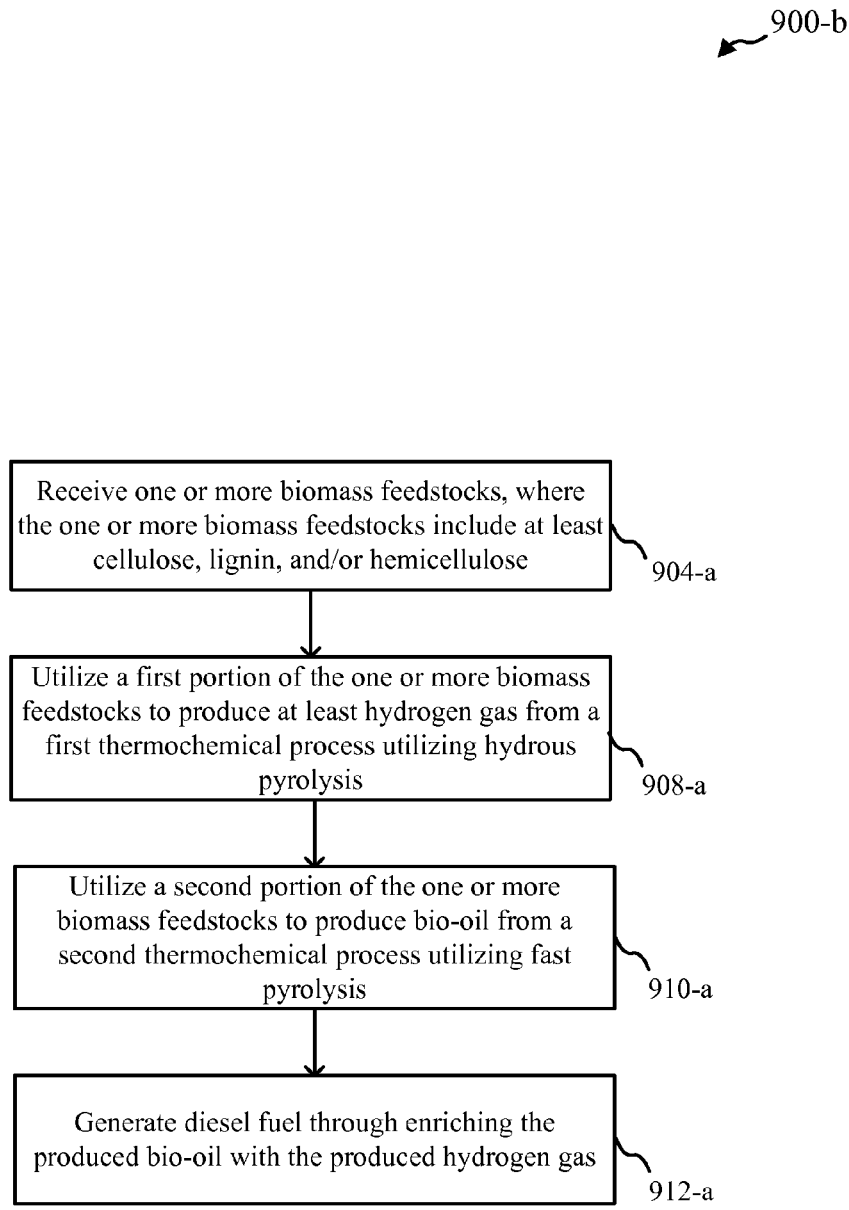
FIG. 9B is a flow diagram for continuous liquid fuel production utilizing biomass in accordance with various embodiments.

FIG. 9B provides an overview of a method 900-b of continuous liquid fuel production utilizing biomass in accordance with various embodiments. Method 900-b may be implemented utilizing aspects of system 100-a of FIG. 1, system 100-b of FIG. 1B, system 200 of FIG. 2, system 300 of FIG. 3, system 800-a of FIG. 8A, and/or system 800-b of FIG. 8B. In FIG. 9B, the specific selection of steps shown and the order in which they are shown is intended merely to be illustrative. It is possible for certain steps to be performed in alternative orders, for certain steps to be omitted, and for certain additional steps to be added according to different embodiments of the invention. Some but not all of these variants are noted in the description that follows. Method 900-b may be an example of method 900-a of FIG. 9.

At block 904-a, one or more biomass feedstocks may be received. At block 904-a one or more biomass feedstocks may be received. The one or more biomass feedstocks may include at least cellulose, lignin, and/or hemicelluloses. At block 908-a, a first portion of the one or more biomass feedstocks may be utilized to produce at least hydrogen gas from a first thermochemical process utilizing hydrous pyrolysis. At block 910-a, a second portion of the one or more biomass feedstocks may be utilized to produce bio-oil from a second thermochemical process utilizing fast pyrolysis. At block 912-a, diesel fuel may be generated through enriching the produced bio-oil with the produced hydrogen gas While detailed descriptions of one or more embodiments have been given above, various alternatives, modifications, and equivalents will be apparent to those skilled in the art without varying from the spirit of the invention. Moreover, except where clearly inappropriate or otherwise expressly noted, it should be assumed that the features, devices, and/or components of different embodiments may be substituted and/or combined. Thus, the above description should not be taken as limiting the scope of the invention, which is defined by the appended claims.

What is claimed is:

1. A method of continuous liquid fuel production utilizing biomass, the method comprising:
   receiving one or more biomass feedstocks;
   utilizing a first portion of the one or more biomass feedstocks to produce synthesis gas from a first thermochemical process, wherein the first thermochemical process comprises: combining water with the first portion of the one or more biomass feedstocks to form a wet biomass feedstock; transferring the wet biomass feedstock to a reaction chamber; and heating the wet biomass feedstock within the reaction chamber to a temperature between 700 degrees Celsius and 1,100 degrees Celsius under atmospheric pressure such that the elements comprised by the wet biomass feedstock dissociate and react to form at least the synthesis gas;
   utilizing a second portion of the one or more biomass feedstocks to produce bio-oil from a second thermochemical process; and
   generating a liquid fuel through combining the produced synthesis gas and the produced bio-oil.

2. The method of claim 1, where the elements comprised by the wet biomass feedstock dissociate and react through a non-oxidation reaction to form at least the synthesis gas.

3. The method of claim 2, wherein the non-oxidation reaction comprises a hydrous pyrolysis reaction.

4. The method of claim 1, wherein the synthesis gas comprises hydrogen gas.

5. The method of claim 1, wherein the one or more biomass feedstocks comprises at least cellulose, lignin, or hemicellulose.

6. The method of claim 1, wherein the second thermochemical process comprises a fast pyrolysis process.

7. The method of claim 1, where generating the liquid fuel through combining the produced synthesis gas and the produced bio-oil comprises a hydrotreating process.

8. The method of claim 1, where generating the liquid fuel through combining the produced synthesis gas and the produced bio-oil comprises a hydrocracking process.

9. The method of claim 1, wherein the first thermochemical process and the second thermochemical process are performed concurrently and at a common location.

\* \* \* \* \*